United States Patent
Mase

(10) Patent No.: US 9,235,056 B2
(45) Date of Patent: Jan. 12, 2016

(54) THREE-DIMENSIONAL IMAGE DISPLAY DEVICE

(75) Inventor: Jitsuro Mase, Hiroshima (JP)

(73) Assignee: Rights Co., Ltd., Tokyo (JP)

( * ) Notice: Subject to any disclaimer, the term of this patent is extended or adjusted under 35 U.S.C. 154(b) by 632 days.

(21) Appl. No.: 13/574,651

(22) PCT Filed: Nov. 22, 2011

(86) PCT No.: PCT/JP2011/076861
§ 371 (c)(1),
(2), (4) Date: Jul. 23, 2012

(87) PCT Pub. No.: WO2012/070553
PCT Pub. Date: May 31, 2012

(65) Prior Publication Data
US 2012/0287503 A1  Nov. 15, 2012

(30) Foreign Application Priority Data

Nov. 25, 2010  (WO) .................. PCT/JP2010/071053
Oct. 27, 2011  (JP) .................................. 2011-235946

(51) Int. Cl.
*G02B 27/22* (2006.01)
*H04N 13/04* (2006.01)
(Continued)

(52) U.S. Cl.
CPC ........ *G02B 27/2221* (2013.01); *G02B 27/0101* (2013.01); *G02B 27/2235* (2013.01);
(Continued)

(58) Field of Classification Search
CPC ..... G02B 27/2235; G02B 27/24; G03B 21/28
USPC ......... 359/462, 465, 802, 466, 871, 872, 849, 359/850, 856, 857, 861; 353/28, 10, 30, 98, 353/99; 348/58
See application file for complete search history.

(56) References Cited

U.S. PATENT DOCUMENTS 4,306,768 A * 12/1981 Egging ................. A63F 9/0291
273/148 B
5,086,354 A * 2/1992 Bass et al. ...................... 359/465
(Continued)

FOREIGN PATENT DOCUMENTS

FR  2 790 575 A1  9/2000
JP  2002-077341  3/2002
(Continued)

OTHER PUBLICATIONS

Chinese Office Action dated Mar. 28, 2014, issued in corresponding Chinese Patent Application No. 201180010835.X.
(Continued)

*Primary Examiner* — Audrey Y Chang
(74) *Attorney, Agent, or Firm* — Brundidge & Stanger, P.C.

(57) ABSTRACT

A three-dimensional image display device is provided which enables viewing an image displayed on a screen of an image display device as a three-dimensional image having a compact structure. The three-dimensional image display device which three-dimensionally displays an image displayed on the screen of an image display device using a mirror device includes a main body case for accommodating an image display device, and a minor device supported in a rear part of the main body case. A plurality of mirrors are rotatably supported on the mirror device in parallel at predetermined intervals in the depth direction, and when a three-dimensional image is displayed, the mirror device rotates about a shaft toward opening from the main body case so that the plurality of mirrors are supported at a predetermined angle toward a viewer relative to the screen of the image display device, and reflects the image displayed on the screen of an image display device toward the viewer.

9 Claims, 32 Drawing Sheets

(51) Int. Cl.
*G03B 21/28* (2006.01)
*G02B 27/01* (2006.01)

(52) U.S. Cl.
CPC ............ *G03B21/28* (2013.01); *H04N 13/0443* (2013.01); *H04N 13/0459* (2013.01); *H04N 2213/001* (2013.01)

(56) References Cited

U.S. PATENT DOCUMENTS

| | | | | |
|---|---|---|---|---|
| 5,654,779 | A | * | 8/1997 | Nakayama et al. ............ 349/58 |
| 6,052,239 | A | * | 4/2000 | Matsui et al. ................ 359/802 |
| 7,237,937 | B2 | * | 7/2007 | Kawashima et al. ........ 362/602 |
| 8,279,271 | B2 | * | 10/2012 | Choi .................. H04N 13/0434 348/58 |
| 2002/0186228 | A1 | | 12/2002 | Kobayashi |
| 2007/0070191 | A1 | | 3/2007 | Choi |

FOREIGN PATENT DOCUMENTS

| | | |
|---|---|---|
| JP | 2002-372929 | 12/2002 |
| JP | 2006-135378 | 5/2006 |
| JP | 2008-020564 | 1/2008 |
| JP | 2009-053539 | 3/2009 |
| JP | 2010-141447 | 6/2010 |

OTHER PUBLICATIONS

International Search Report from PCT/JP2011/076861 mailed Dec. 27, 2011.
European Search Report dated Apr. 10, 2015, based in European Patent Application No. 11843049.5-1562.
"Palm Top Theater (2010)", Retrieved from the Internet: URL:https://www.youtube.com/watch?v=na-R4rZkzh0, Nov. 8, 2010, XP054975806.

* cited by examiner

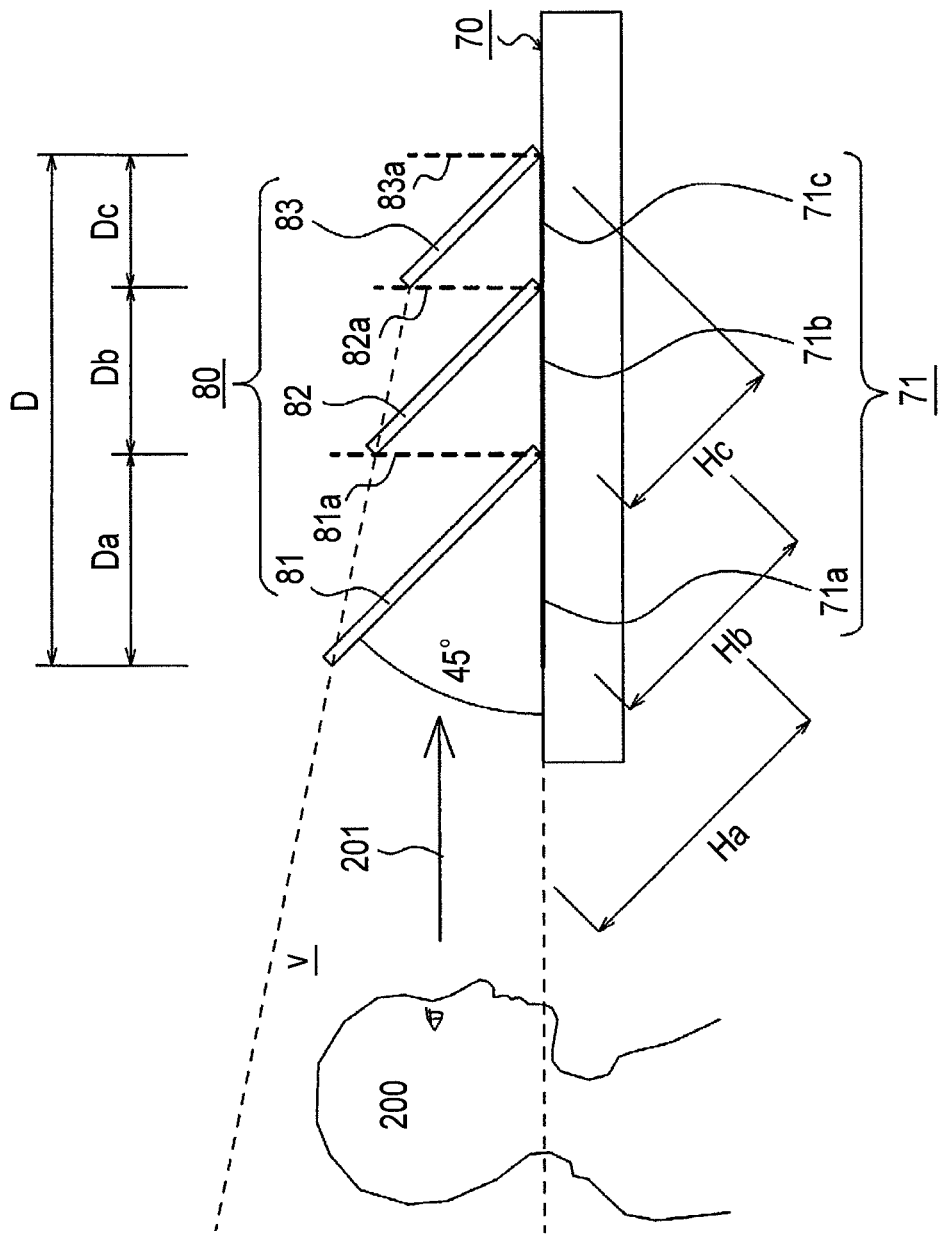

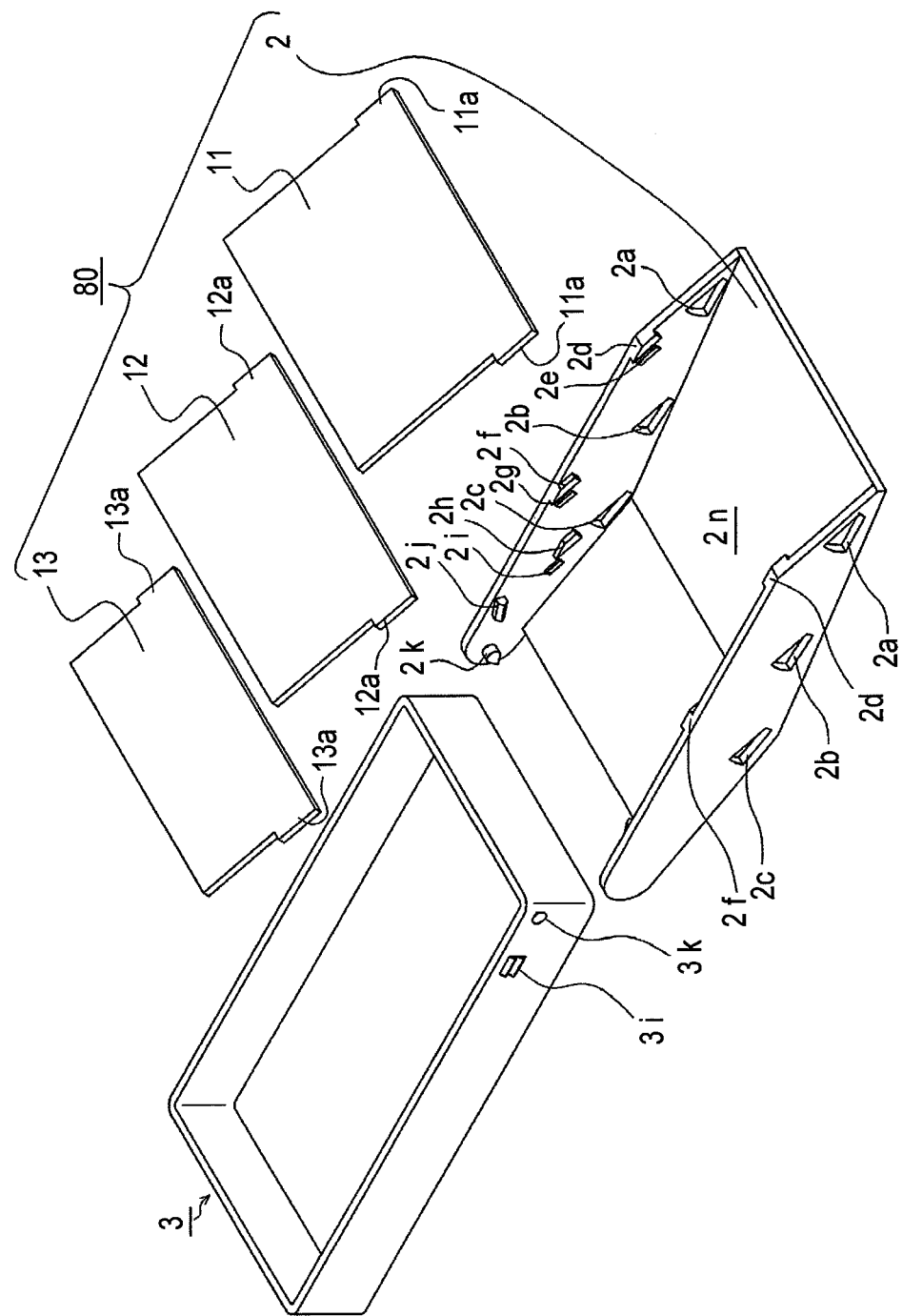

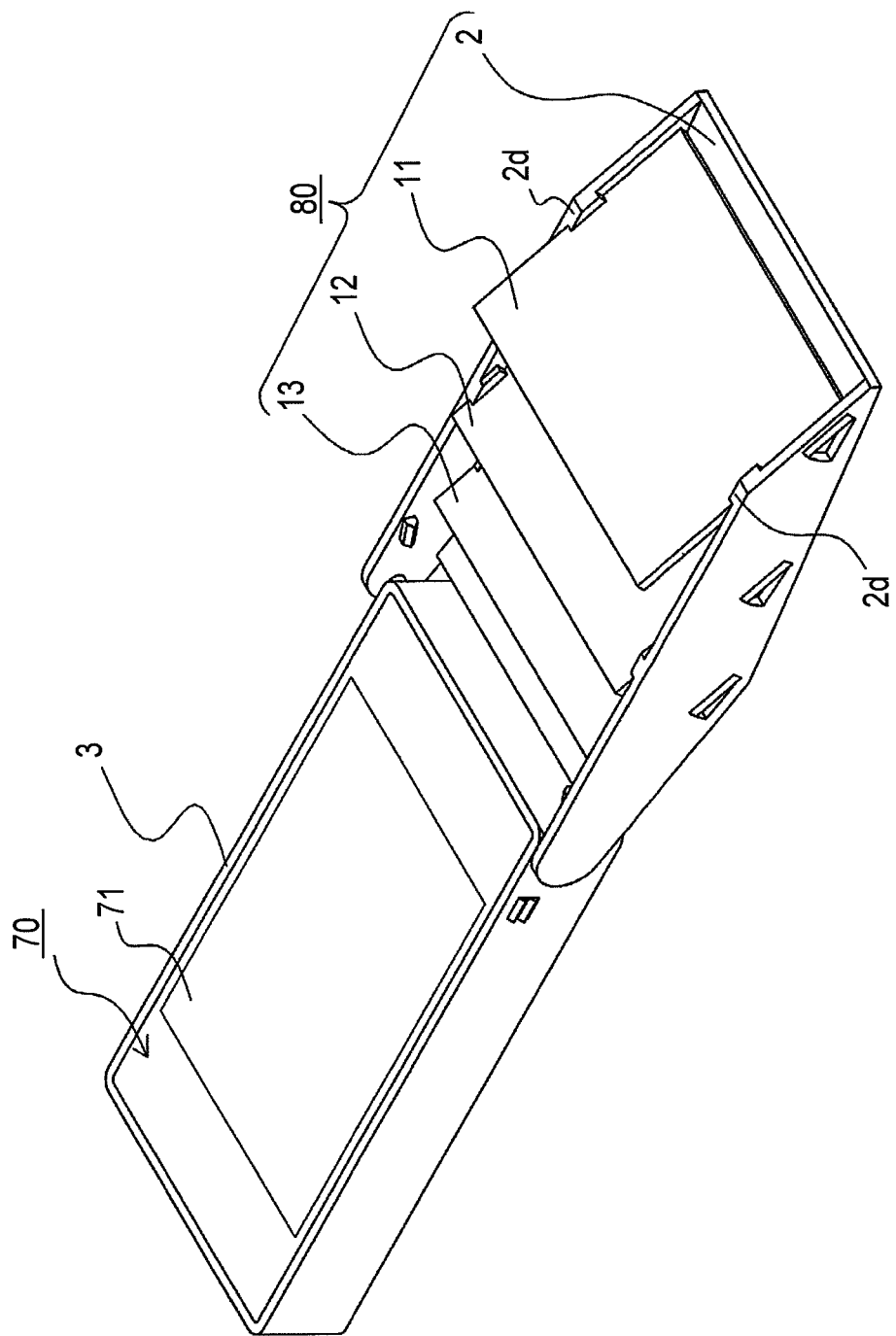

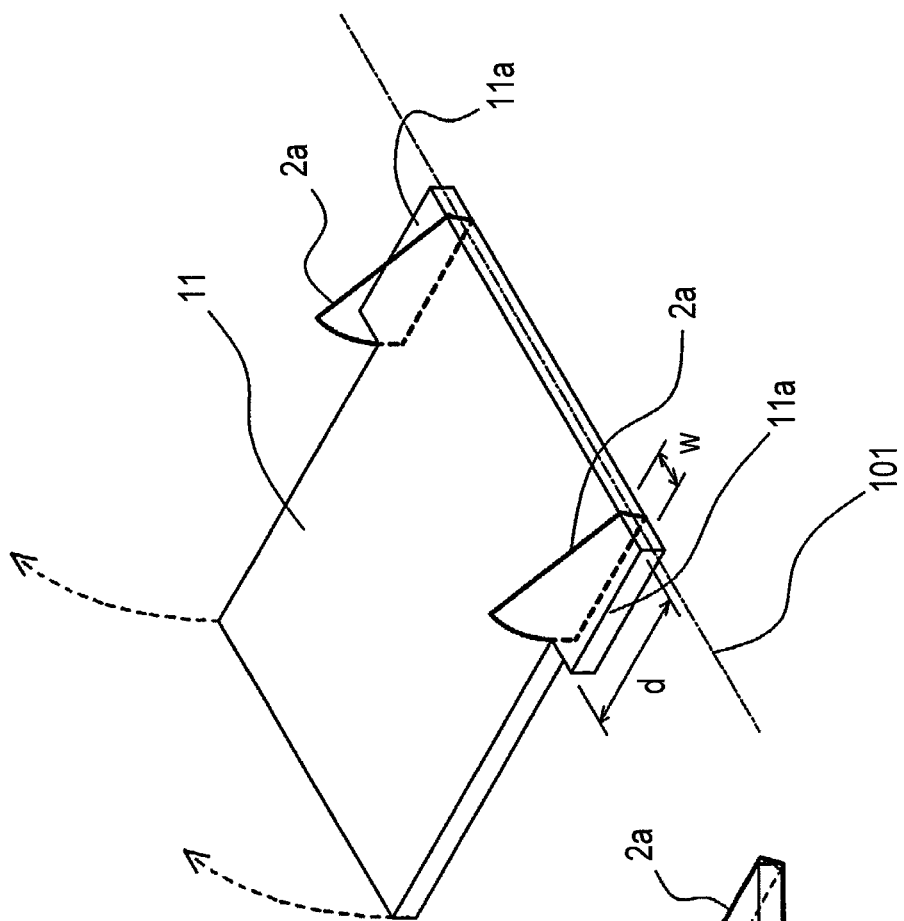
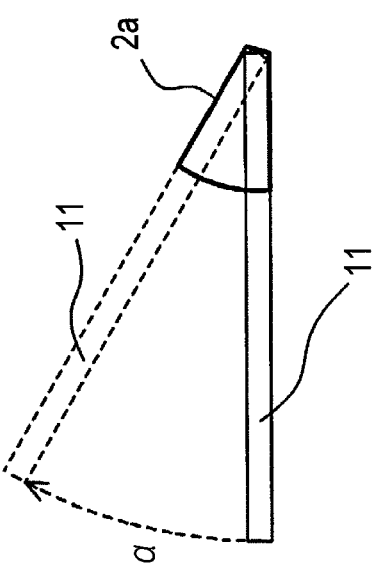
FIG. 5A
FIG. 5B

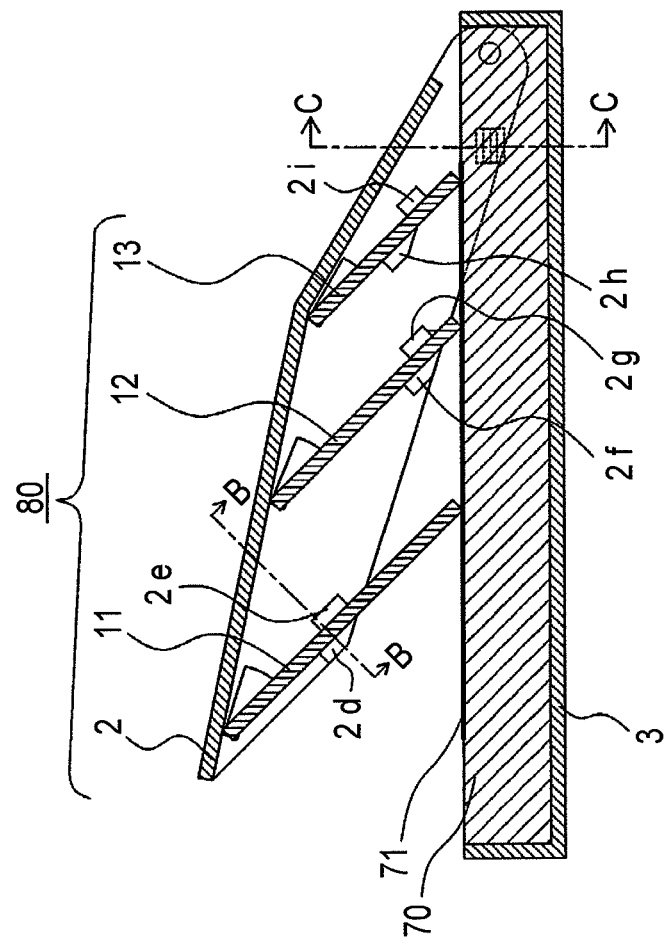
FIG. 9A
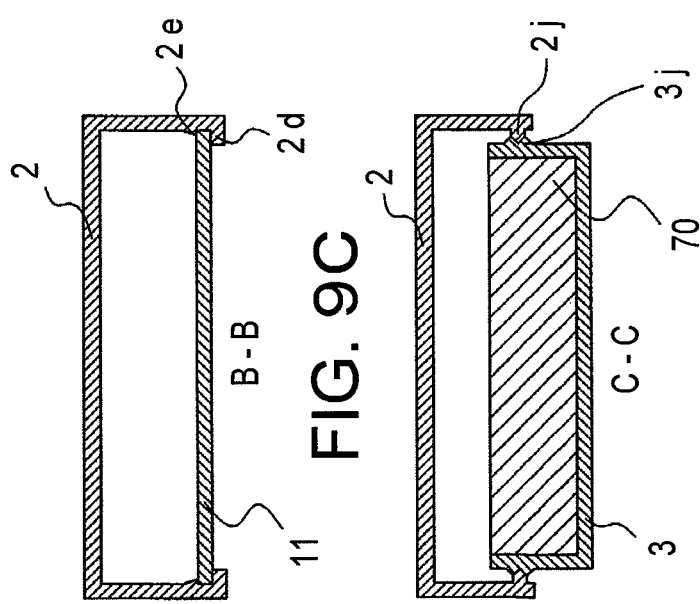
FIG. 9B
FIG. 9C

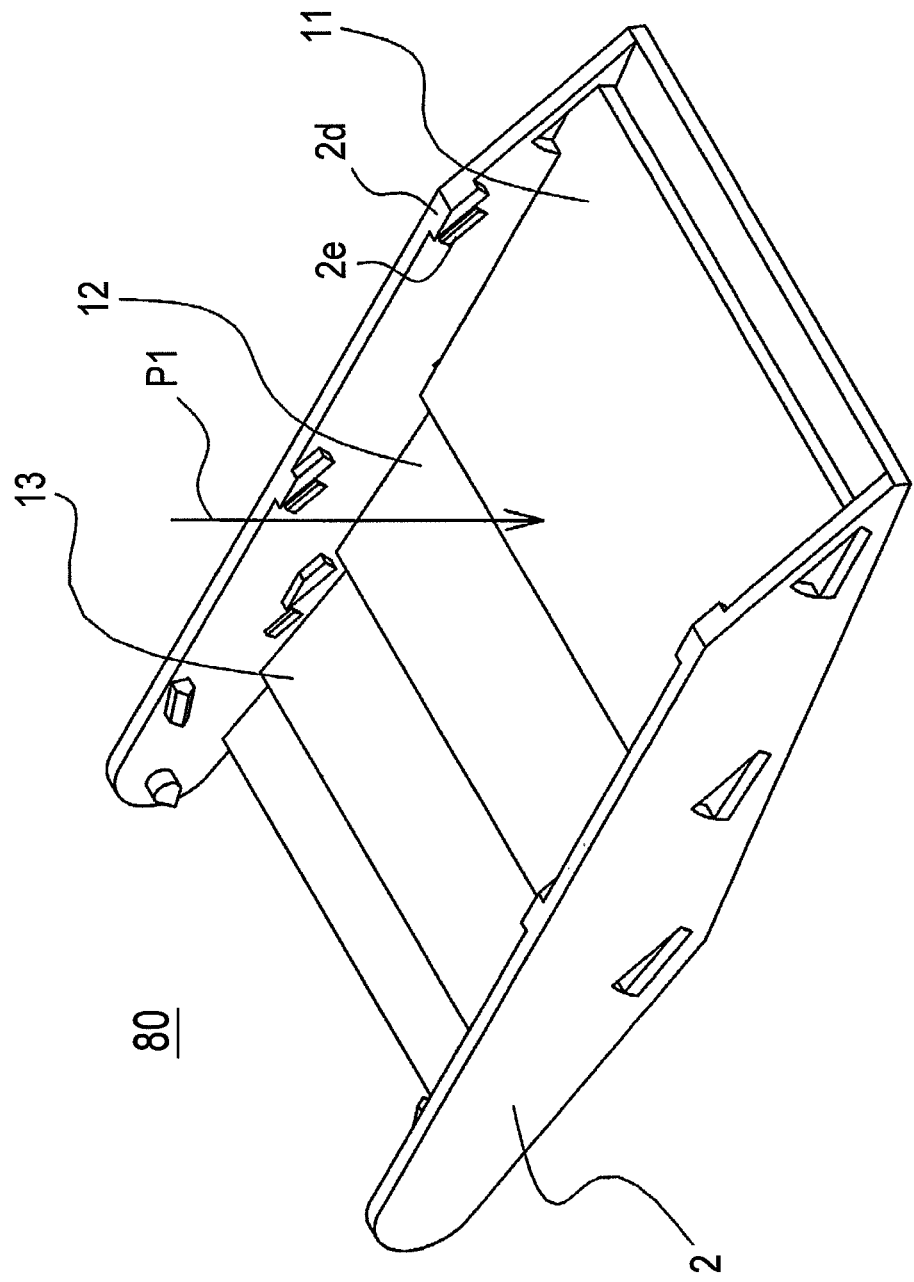

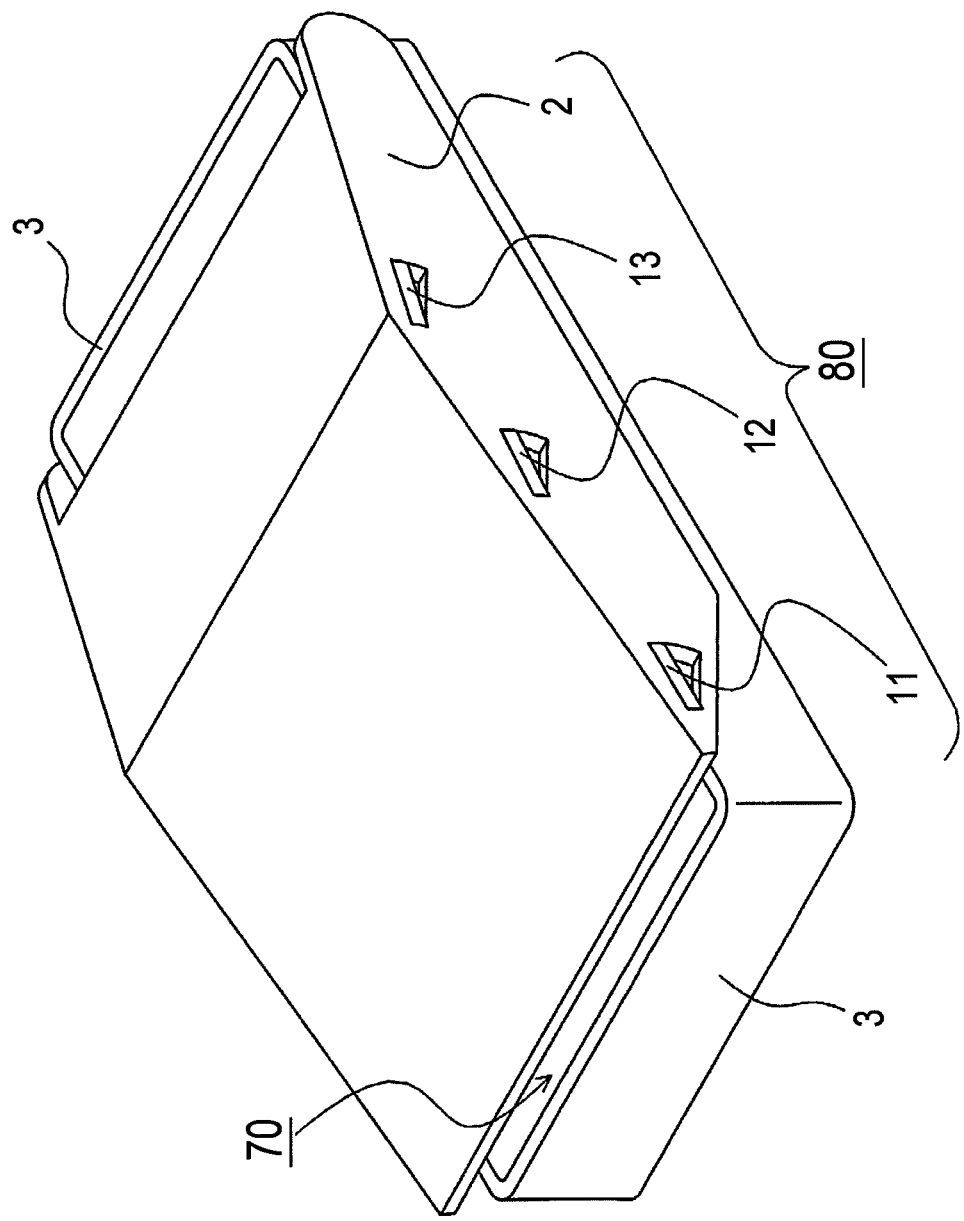

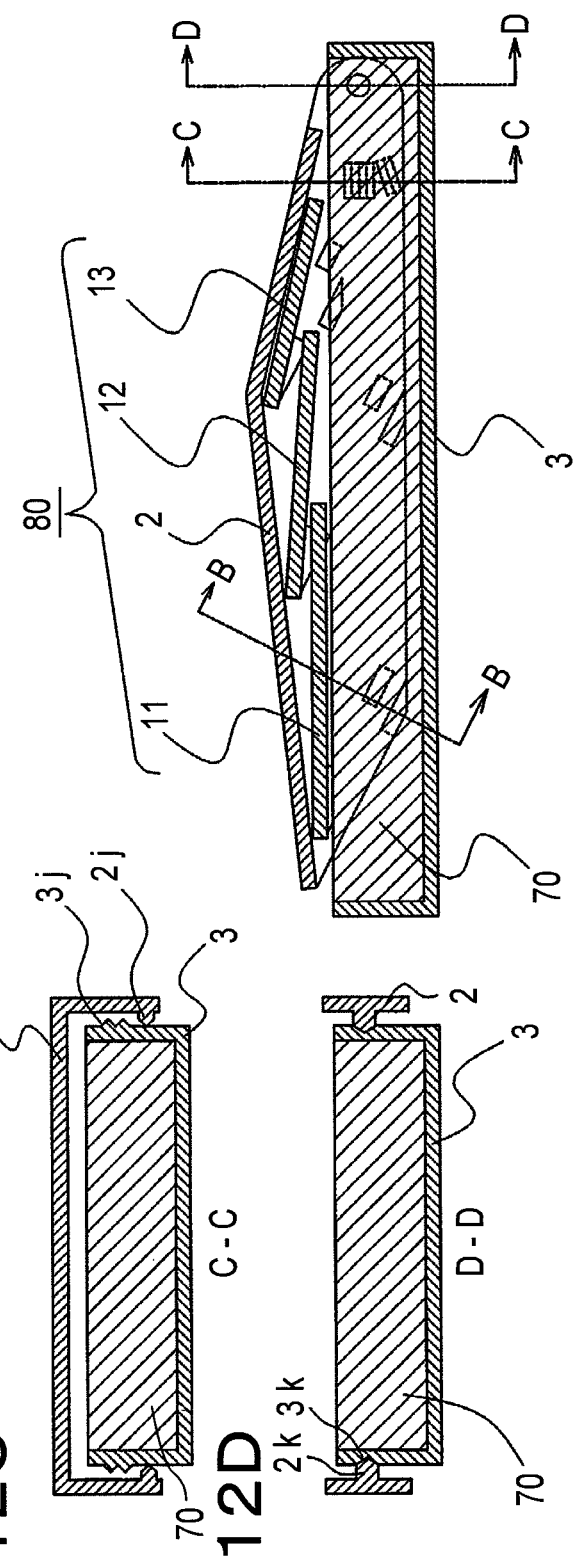
FIG. 12A
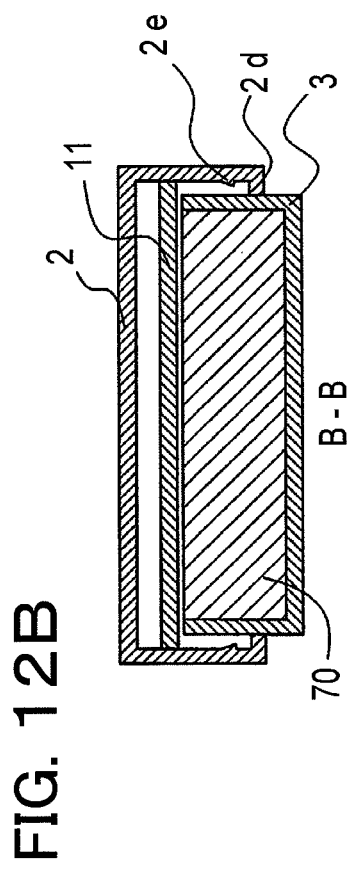
FIG. 12B
FIG. 12C
FIG. 12D

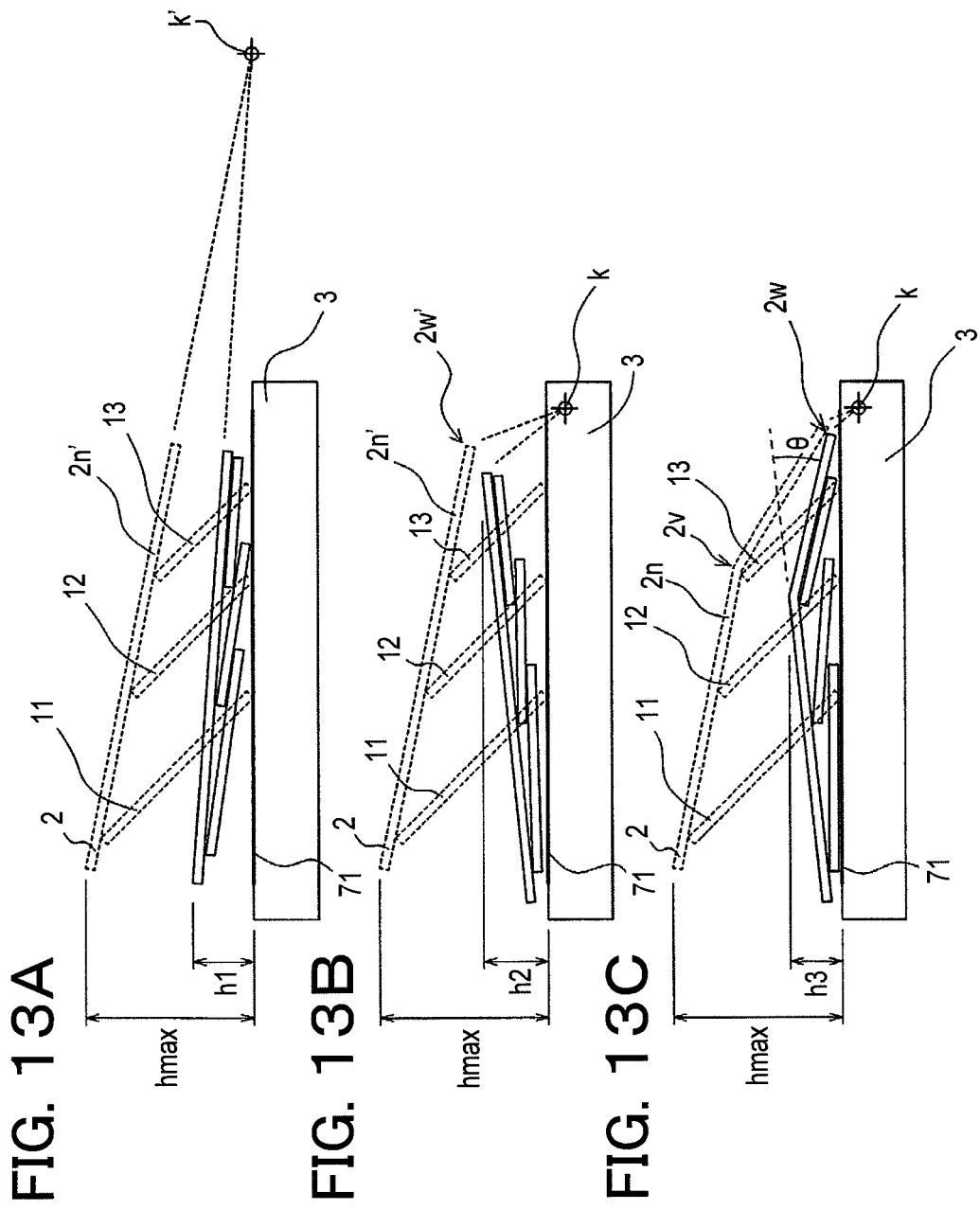

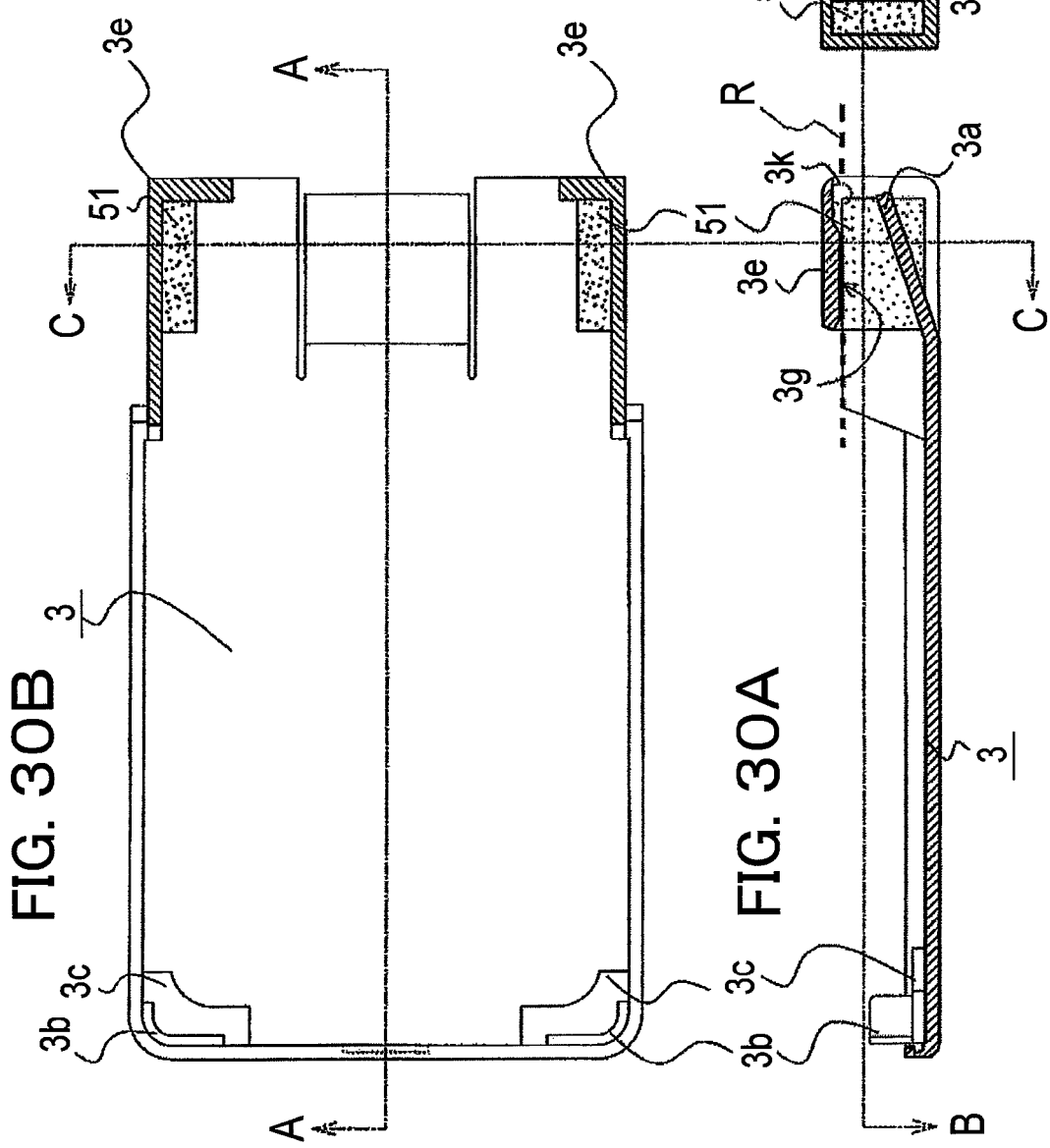

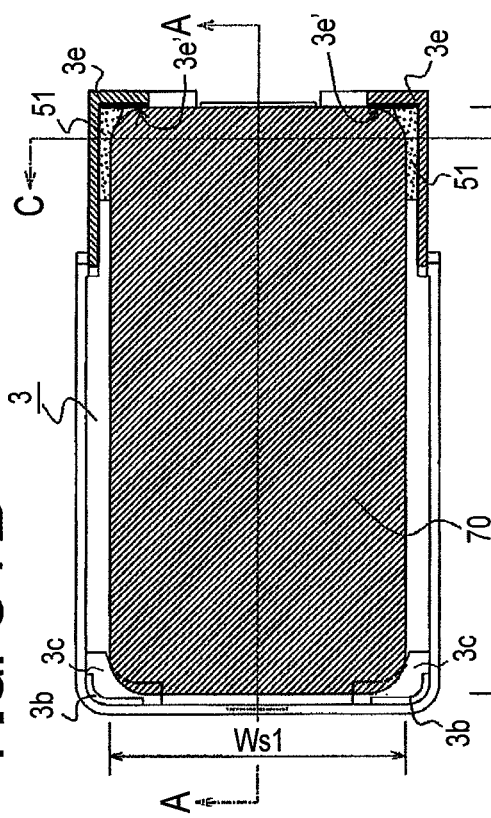
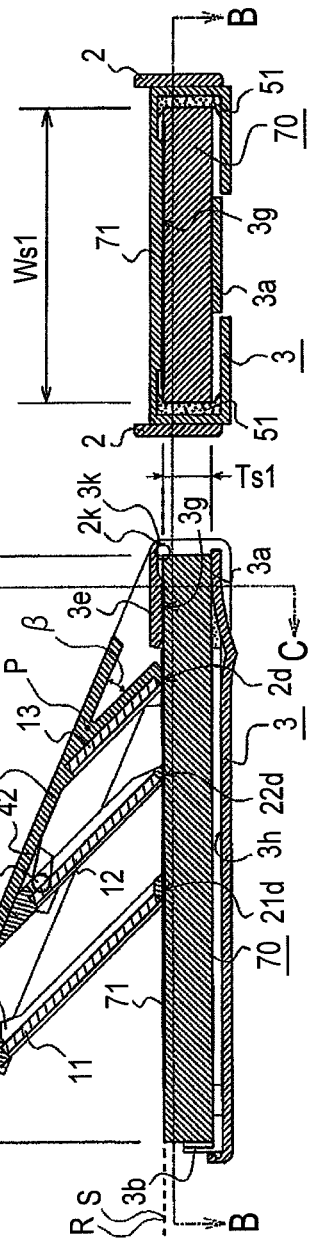
FIG. 31B
FIG. 31A
FIG. 31C

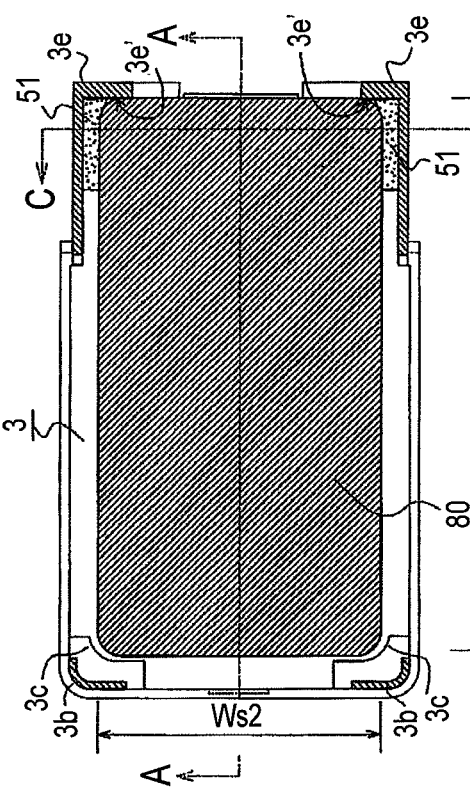
FIG. 32B
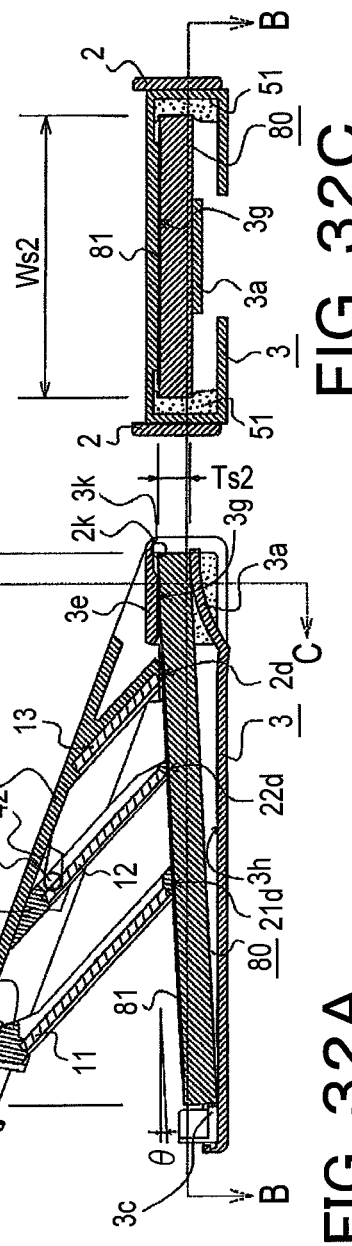
FIG. 32A
FIG. 32C

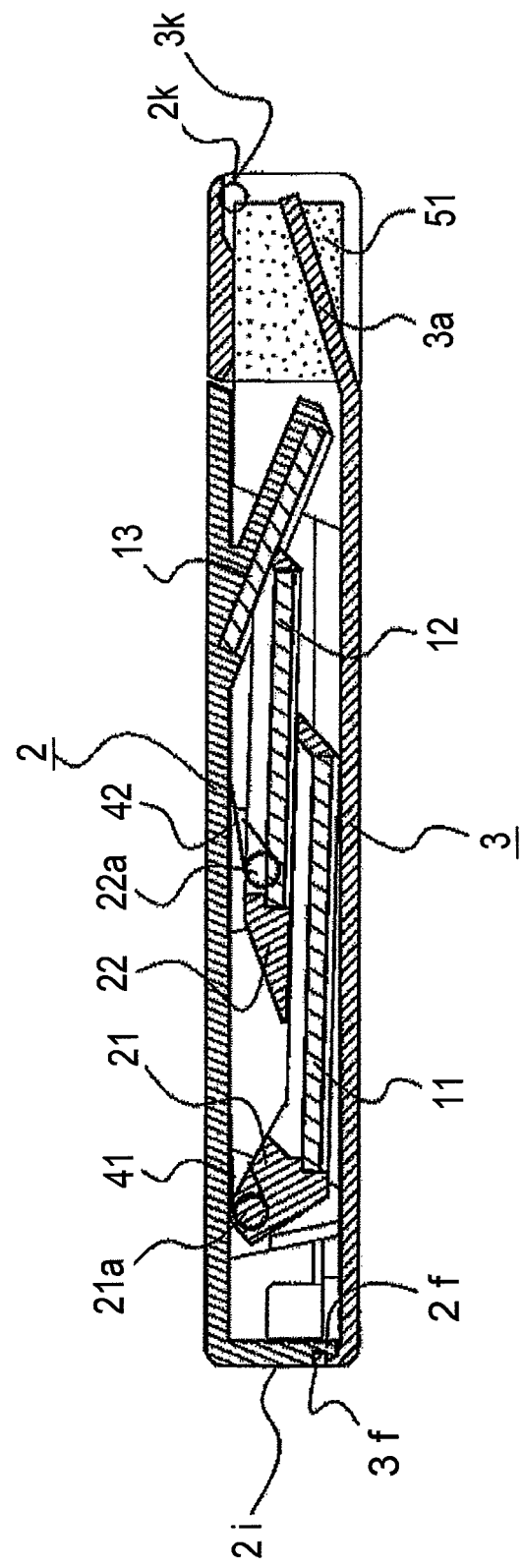

ent No. 2010-141447
Patent Document 5: Japanese Unexamined Patent Publication No. 2006-135378

THREE-DIMENSIONAL IMAGE DISPLAY DEVICE

TECHNICAL FIELD

The present invention relates to a three-dimensional image display device, and especially to a three-dimensional image display device which displays a two-dimensional image displayed on a two-dimensional image display device as a three-dimensional image using mirrors.

BACKGROUND ART

Known three-dimensional image display devices include a three-dimensional image display device having a mirror assembly including a plurality of half mirrors disposed in a two-dimensional image display device. For example, Patent Documents 1, 2 and 5 disclose three-dimensional image display devices which produce three-dimensional images by simultaneously displaying a virtual image produced by half mirrors from an image displayed on a two-dimensional image display device on a plurality of display surfaces located in different positions in the depth direction when seen from the viewer. For example, the three-dimensional display device described in Patent Document 1 is suggested by the inventor of the present invention. This three-dimensional display device is formed by a plurality of half mirrors so that their heights decrease as they go further in the depth direction, and the range where an image region can be generated and visually recognized is expanded.

The thus-created three-dimensional image by disposing a plurality of half mirrors in the two dimensional image device and overlapping two-dimensional virtual images resembles settings used on the stage of a theatrical performance, and does not require special eye glasses. In terms of physiological factors of stereopsis, the device involves using all factors used to see normal stereopsis such as convergence, focusing, binocular parallax and motion parallax, and therefore the device causes no eye strain as experienced with a three-dimensional image device seen only with some of the factors such as binocular parallax and convergence.

Recently, as described in Patent Documents 3 and 4, providing portable terminals having display devices such as cellular phones and portable game devices with two-dimensional display and three-dimensional display functions has been suggested. That is, the technique described in Patent Document 3 includes a mechanism which invertibly retains a display device having a three-dimensional display screen by the lenticular method on cellular phones and the like. Moreover, in the technique described in Patent Document 4, an image is projected on a three-dimensional display component including built-in half mirrors, concave mirrors and other components, and displayed as a virtual stereoscopic image like it is floating in the space via a three-dimensional image display window of a cellular phone.

PRIOR ART DOCUMENTS

Patent Documents

Patent Document 1: Japanese Unexamined Patent Publication No. 2008-20564
Patent Document 2: Japanese Unexamined Patent Publication No. 2009-53539
Patent Document 3: Japanese Unexamined Patent Publication No. 2002-372929
Patent Document 4: Japanese Unexamined Patent Publication No. 2010-141447
Patent Document 5: Japanese Unexamined Patent Publication No. 2006-135378

SUMMARY OF THE INVENTION

Problems to be Solved by the Invention

According to the technique described in Patent Document 3, a mechanism for invertibly retaining a display device having a three-dimensional display screen by the lenticular method is indispensable. However, a user who uses a cellular phone of a certain communication carrier does not necessarily need this type of three-dimensional display function, and consequently the user is forced to purchase a costly cellular phone provided with the three-dimensional display function.

Moreover, according to the technique described in Patent Document 4, it is essential to provide the cellular phone with a three-dimensional display device having components such as half mirrors and concave mirrors. Accordingly, as in the case of the technique of Patent Document 3, a special mechanism for three-dimensional display is necessary for a cellular phone, which increases its costs. Moreover, the techniques of Patent Documents 3 and 4 require a mechanism specific to cellular phones. For example, employing this three-dimensional display function uniformly for cellular phones generally spread in communication carrier companies is actually difficult.

To this end, an object of the present invention is to provide a compactly structured three-dimensional image display device which allows the user to view an image displayed on a screen of an image display device as a three-dimensional image.

Another object of the present invention is to provide a three-dimensional image display device which displays an image displayed on a screen of an image display device as a three-dimensional image without making any mechanism or modification specific to an image display device for three-dimensional image display.

Another object of the present invention is to provide a compactly-structured three-dimensional image display device by using several mirrors that reflect an image and are accommodated by rotating and folding.

Another object of the present invention is to provide a three-dimensional image display device which can accept image display devices having different dimensions, i.e., widths and thicknesses.

Means for Solving the Problems

The three-dimensional image display device according to the present invention is, preferably, a three-dimensional image display device which three-dimensionally displays an image displayed on a screen of an image display device, the three-dimensional image display device including: an attaching mechanism for attaching the image display device; and a mirror device which is rotatably supported in a predetermined part of the attaching mechanism, wherein the mirror device is provided with a plurality of mirrors disposed in parallel with each other at predetermined intervals in the depth direction, and the mirror device, when a three-dimensional image is displayed, rotates about a shaft so that the plurality of mirrors are positioned at an predetermined angle toward a viewer relative to the screen of the image display device, and reflects and displays an image displayed on the screen of the image display device toward the viewer.

In a preferable example, the attaching mechanism includes a main body case for accommodating the image display device, the mirror device is rotatably supported in a rear part of the main body case, and the mirror device is rotated backwardly about a shaft in a manner of being opened from the main body case, and the image display device is allowed to be attached to the main body case in this state.

In another preferable example, the attaching mechanism includes a main body case for accommodating the image display device, the mirror device is rotatably supported about a rear end part of the main body case, a plurality of mirrors are rotatably supported on the mirror device in parallel at predetermined intervals in the depth direction, and when a three-dimensional image is displayed, the mirror device rotates about a shaft to the main body case side, the plurality of mirrors are supported at a predetermined angle toward the viewer relative to the screen of the image display device to reflect the image displayed on the screen, and when a three-dimensional image is not displayed, the mirror device rotates about a shaft to the main body case side, and the plurality of mirrors are accommodated in a state of being folded inside the mirror device.

Preferably, the mirror device is capable of rotationally moving between a first position in which an image displayed on the screen is reflected toward a viewer, the first position being attained by, in a state that the image display device is accommodated in the main body case, forwardly rotating the mirror device about the shaft to bring front ends of the plurality of mirrors into contact with the screen of the image display device and supporting the plurality of mirrors, and a second position in which an image displayed on the screen of the image display device can be viewed, the second position being attained by backwardly rotating the mirror device about the shaft to remove the plurality of mirrors from the screen of the image display device.

Preferably, the mirror device has a mirror case which supports and mounts the plurality of mirrors, and the mirror case is rotatably supported on the main body case.

Preferably, the plurality of mirrors are disposed so that the heights of the mirrors decrease from the front to the back, and the three-dimensional image display device includes first and second half mirrors disposed on the side closer to the viewer, and a total reflection mirror disposed behind the first and second half mirrors.

Preferably, the thickness of the image display device and the mirror device when the plurality of mirrors are folded within the mirror device on a screen of the image display device can be reduced to 30% when the plurality of mirrors are in a first position so that they are in close contact with the screen of the image display device to allow three-dimensional image viewing.

Preferably, the mirror device and the main body case are made of a synthetic resin. Preferably, the main body case accommodates, as the image display device, a portable display device having a screen which displays a two-dimensional image.

Preferably, the mirror device has a mirror case formed with the plurality of mirrors disposed and fixed at predetermined intervals in the depth direction to form predetermined angles, and the mirror case is supported on a rear part of the main body case.

The three-dimensional image display device according to the present invention is preferably a three-dimensional image display device which three-dimensionally displays an image displayed on a screen of an image display device using a plurality of mirrors, the three-dimensional image display device having a mirror device which includes: a main body case on which the image display device is attached; a mirror case which is supported in a predetermined part of the main body case; and a plurality of mirrors rotatably mounted on the mirror case in parallel at predetermined intervals from the front to the back of the mirror case, wherein the mirror case, when a three-dimensional image is displayed, rotates about a shaft so that front end parts of the plurality of mirrors form approximately the same plane, reflecting an image displayed on a screen of the image display device in a state that the plurality of mirrors are supported and tilted at a predetermined angle to the viewer side relative to the screen, and the mirror case, in a state that the image display device is removed from the main body case, rotates about the shaft to the main body case side so that the plurality of mirrors rotate about the shaft and are accommodated in a state of being folded within the mirror case.

Preferably, the plurality of mirrors are attached to a quadrangular mirror frame, respectively, and in a state that the image display device is attached to the main body case, the mirror case rotates about the shaft to be supported in a state that front ends the plurality of mirror frames are in contact with the screen of the image display device, and reflects an image displayed on the screen of the image display device toward the viewer.

Preferably, the mirror case is caused to be rotatable between a first position in which a three-dimensional image is displayed by reflecting an image displayed on the screen of the image display device in a state that the plurality of mirrors are supported at a predetermined angle relative to the screen, the first position being attained by, in a state that the image display device is attached to the main body case and the mirror case rotates about the shaft, and a second position in which the viewer can view an image displayed on the screen of the image display device, the second position being attained by backwardly rotating the mirror case about the shaft to remove the plurality of mirrors from the screen of the image display device.

Preferably, the sides defining the heights of the plurality of quadrangular mirrors are formed to decrease from the front to the back, and the plurality of mirrors include first and second half mirrors which are disposed on the front side and are rotatable relative to the mirror case about a shaft, and a total reflection mirror disposed behind the first and second half mirrors and fixed on the mirror case.

Preferably, the main body case includes a flange surrounding the same, and a housing part which lies within a part surrounded by the flange and accommodates the image display device.

Preferably, the main body case includes a pair of soft components disposed on both sides of an inner part of the same, and retains, by the soft components, a side part of the image display device to which it is attached.

Preferably, the main body case includes a socket part at which a top head part of the image display device is inserted into its inner part, and a flat spring which lies at the inner bottom of the socket part and presses the bottom of the inserted image display device upward.

Preferably, the shaft provided at a rear end of the mirror case and front end parts of the plurality of mirror frames are on the same plane during three-dimensional image viewing, a shaft bearing which engages the shaft of the mirror case is provided at the rear end of the main body case, a reference plane formed by an upper part within the socket part of the main body case is on the same plane as the shaft bearing, when the image display device is attached to the body socket, the screen of the image display device is brought into contact with the reference plane by the pressure of the flat spring part of the main body case, and the plurality of mirror frames are positioned at the screen, regardless of a tilt due to a difference in thickness of the image display device.

Preferably, a hook is provided at a front end of the mirror case, a hook hole is provided in a front part of the flange of the main body case, and when the mirror case is rotated and is closed inside the main body case, the hook and the hook hole are engaged to retain the state that the mirror case and the main body case are combined.

Preferably, each of the main body case and the mirror case forms a box shape, and the two components form a single box shape in a state that the mirror case is closed inside and joined with the main body case.

Preferably, the three-dimensional image display device according to the present invention is also constituted as a three-dimensional image display device which three-dimensionally displays an image displayed on a screen of the image display device, the three-dimensional image display device including: a main body case on which the image display device is attached; and a mirror device including a mirror case which is integrally formed with the main body case and in which a plurality of mirrors are disposed and fixed in parallel at predetermined intervals in the depth direction and at a predetermined angle, wherein the plurality of mirrors, when a three-dimensional image is displayed, are positioned on the viewer side relative to the screen of the image display device and tilted at a predetermined angle, and reflect and display an image displayed on the screen of the image display device toward the viewer.

In a preferable example, the mirror device is supported in a predetermined part of the main body case, when a three-dimensional image is displayed, the mirror case rotates about the shaft to the main body case side, and the plurality of mirrors are positioned on the viewer side relative to the screen of the image display device and tilted at a predetermined angle to reflect the image displayed on the screen of the image display device. Preferably, the mirror device is formed integrally and fixedly with the main body case.

Effect of the Invention

According to the present invention, by providing a structure in which a part of the bulky half mirrors can be folded and made compact, a three-dimensional image display device suitable for storage and carrying can be provided.

Moreover, by rotating the part of the mirror device to remove the same from the screen of the image display device, it is possible to switch between the image displayed on the screen and the three-dimensional image by simple operation.

Moreover, according to the present invention, the image display device can be easily attached, and three-dimensional images can be easily viewed without wearing special eye glasses as in conventional examples. Moreover, three-dimensional images can be displayed by using image display devices which have already been put in practical use, without any special modification of the image display device.

Moreover, by causing the mirror device to be rotatable relative to the main body case and rotating and folding a plurality of mirrors which reflect an image and accommodating the same in the mirror device, a compact and easy-to-carry structure is provided.

Furthermore, a variety of image display devices differently sized in width, height, etc, can be accepted, and types of devices which enable three-dimensional image viewing are expanded.

BRIEF DESCRIPTION OF THE DRAWINGS

FIG. 1 is a perspective view which shows the principle of a three-dimensional image display device.
[FIG. 2]
FIG. 2 is a perspective view which shows the principle of a three-dimensional image display device.
[FIG. 3]
FIG. 3 is an exploded perspective view which shows a mirror device and a main body case in a first embodiment.
[FIG. 4]
FIG. 4 is a perspective view of the three-dimensional image display device in a state which allows for viewing of the screen of the two-dimensional image display device in the first embodiment.
[FIG. 5]
FIGS. 5A-5B are a drawing which explains the mechanism of rotation of the mirror.
[FIG. 6]
FIG. 7 is a drawing which shows details of the shaft of the mirror.
FIG. 8 is a perspective view of the three-dimensional image display device when a three-dimensional image is viewed in the first embodiment.
[FIG. 9]
FIGS. 9A-9C are a cross-sectional view of the three-dimensional image display device when a three-dimensional image is viewed in the first embodiment.
[FIG. 10]
FIG. 10 is a perspective view of the mirror device when the mirrors are folded in the first embodiment.
[FIG. 11]
FIG. 11 is a perspective view of the three-dimensional image display device when the mirrors are folded in the first embodiment.
[FIG. 12]
FIGS. 12A-12D are a cross-sectional view of the three-dimensional image display device when the mirrors are folded in the first embodiment.
[FIG. 13]
FIGS. 13A-13C are a view seen from the side which shows the mechanism that the mirrors are folded.
FIG. 14 is a perspective view which shows notches in the mirror case in the first embodiment.
FIG. 15 is a perspective view of the main body case in the first embodiment.
FIG. 16 is a cross-sectional view of the three-dimensional image display device in the first embodiment.
FIG. 17 is an exploded perspective view of the mirror device in a second embodiment.
FIG. 18 is a perspective view which shows a three-dimensional image display device in the second embodiment.
FIG. 19 is a cross-sectional view of the three-dimensional image display device in the second embodiment.

FIG. 20 is a perspective view of the three-dimensional image display device when a three-dimensional image is viewed in the second embodiment.
FIG. 21 is a cross-sectional view of the three-dimensional image display device when a three-dimensional image is viewed in the second embodiment.
FIG. 22 is a perspective view of the three-dimensional image display device in a state that three-dimensional image viewing is enabled in a third embodiment.
FIG. 23 is a perspective view of the three-dimensional image display device in a state that two-dimensional image viewing is enabled on the screen of the image display device in the third embodiment.
FIG. 24 is an exploded perspective view of the mirror device in the third embodiment.
FIG. 25 is a perspective view of the three-dimensional image display device in a state that the mirror device is closed in the third embodiment.
FIG. 26 is a perspective view of the mirror device in the third embodiment.
FIG. 27 is a perspective view of the main body case in the third embodiment seen from above.
FIG. 28 is a perspective view of the main body case in the third embodiment seen from the bottom face.
FIG. 29 is a sectional side elevational view of the mirror device in the third embodiment.
[FIG. 30]
FIGS. 30A-30C are a cross-sectional view seen from three directions of the main body case in the third embodiment.
[FIG. 31]
FIGS. 31A-31C are a cross-sectional view seen from three directions of the three-dimensional image display device in a state that three-dimensional image viewing is enabled in the third embodiment.
[FIG. 32]
FIGS. 32A-32C are a cross-sectional view seen from three directions of the three-dimensional image display device in a state that three-dimensional image viewing is enabled in the third embodiment.
[FIG. 33]
FIG. 33 is a sectional side elevational view of the three-dimensional image display device in a state that the mirrors are folded in the third embodiment.

MODE FOR CARRYING OUT THE INVENTION

Figure 1:
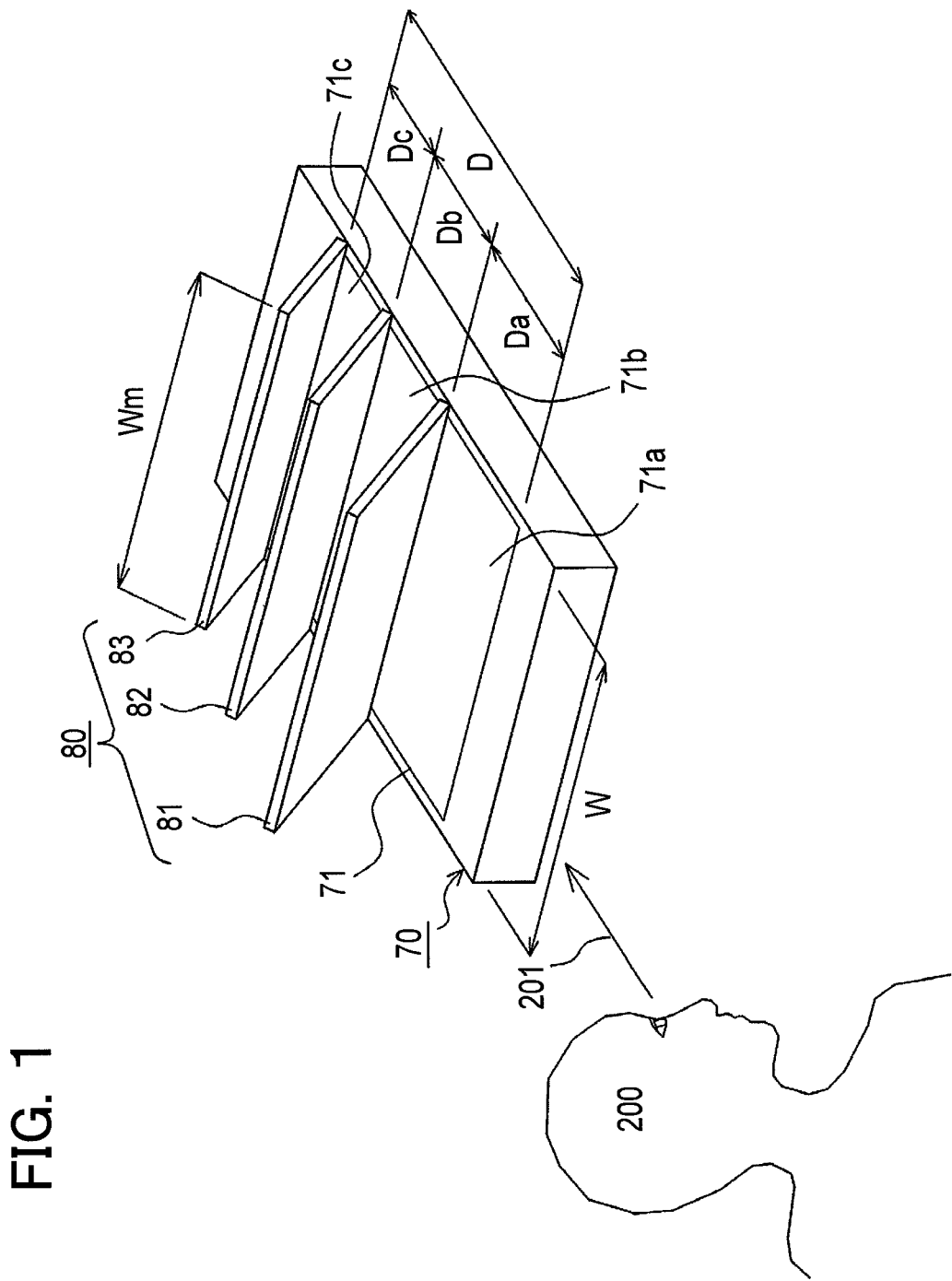
[FIG. 1]

An embodiment of this invention will be described below with reference to drawings. FIGS. 1 and 2 are perspective view and side elevational view which show the positional relationship of elements constituting a three-dimensional image display device according to an embodiment of this invention.

Referring to FIGS. 1 and 2, main components of the three-dimensional image display device are a two-dimensional image display device 70 and a mirror device 80 provided above the two-dimensional image display device 70. Main components of the mirror device 80 are two flat plates of half mirrors 81, 82, and a flat plate of total reflection mirror 83. In FIGS. 1 and 2, only the half mirrors 81, 82 and total reflection mirror 83 of the mirror device 80 are shown, and components for fixing the mirrors in predetermined positions are not shown. In FIG. 2, the half mirrors 81, 82 and total reflection mirror 83 reflect the images displayed on screens 71a, 71b, 71c of the two-dimensional image display device 70, and produce virtual images 81a, 82a, 83a.

As shown in FIG. 2, the half mirrors 81, 82 and total reflection mirror 83 are disposed at predetermined intervals and tilted at predetermined angles relative to a screen 71. The half mirrors 81, 82 and total reflection mirror 83 are disposed on the screen 71 so that they are tilted at a constant angle, and the faces of all the half mirrors 81, 82 and total reflection mirror 83 are parallel with each other. The half mirrors 81, 82 and total reflection mirror 83 are preferably disposed at an angle of about 45° toward a viewer 200.

The two-dimensional image display device 70 means an LCD, a plasma display, an LED display, organic EL display or like component for use in flat-panel televisions, cellular phones, smart phones and the like, but includes a device having a display device such as flat-panel televisions, cellular phones, portable game players, touch-screen tablets and like devices including display parts.

As shown in FIG. 2, a viewing region V is wedge-shaped so that the heights of the half mirrors 81, 82 and total reflection mirror 83 decrease from the front to the back when seen from the viewer 200. The height ratio of the front half mirror 81 to the rear half mirror 82 and the height ratio of the half mirror 82 to the total reflection mirror 83 are the same, and the ratio ranges from 1:0.65 to 1:0.95.

Moreover, the height ratio of the front half mirror 81 to the rear half mirror 82 and the height ratio of the half mirror 82 to the total reflection mirror 83 are preferably defined to be Ha:Hb=1:0.79 and Hb:Hc=1:0.79.

Accordingly, relative to a depth D of the screen 71, the length Da of an image region 71a of the half mirror 81 is 0.41D, the length Db of an image region 71b of the half mirror 82 is 0.33D, and the length Dc of an image region 71c of the total reflection mirror 83 is 0.26D. The heights Ha, Hb, Hc of the half mirrors 81, 82 and the total reflection mirror 83 are 1.4 times greater than Da, Db, Dc, respectively. In FIG. 1, the width Wm of the half mirrors 81, 82 and total reflection mirror 83 is slightly greater than the width W of the screen 71.

A virtual image 81a of the image region 71a below the half mirror 81, a virtual image 82a of the image region 71b below the half mirror 82, and a virtual image 83a of the image region 71c below the total reflection mirror 83 appear on top of each other in a depth position of a direction 201 of the line of sight of the viewer 200, and appear as a three-dimensional image.

By using half mirrors having high reflectance which have not been conventionally used in this embodiment, a brighter three-dimensional image can be obtained. More specifically, the ratio of transmittance:reflectance of visible light of the half mirror 81 which is the closest to the viewer 200 ranges from 67:33 to 60:40, the ratio of transmittance:reflectance of visible light of the next half mirror 82 ranges from 50:50 to 55:45, and ranges from 100% to 80% the reflectance of visible light of the farthest total reflection mirror 83, whereby all virtual images 81a, 81b, 81c appear to have almost the same brightness for the viewer, and an image which has sufficient brightness to be seen in an illuminated room can be obtained. As a result, viewing the three-dimensional image with brightness equivalent to an illuminated room is allowed.

It should be noted that a preferable combination of the transmittance:reflectance of the respective mirrors constituting the mirror device may be as follows: 67:33 for the half mirror 81, 50:50 for the half mirror 82, and the reflectance of the total reflection mirror 83 is 100%. This assumes the case where the reflection performance of the total reflection mirror 83 is high.

Another preferable combination is 69:31 for the half mirror 81, 55:45 for the half mirror 82, and the reflectance of the total reflection mirror 83 is 80%. This assumes the case where the reflection performance of the total reflection mirror 83 is somewhat poor.

Still another preferable combination is 60:40 for the half mirror 81, 50:50 for the half mirror 82, and the reflectance of the total reflection mirror 83 is 80%. The above two combinations are values based on theoretical calculation, but these values are experimentally obtained value.

In order to reduce ghost at this time, the faces of the half mirrors 81, 82 and total reflection mirror 83 with reflective substance coating are disposed to be on the side of the viewer 200.

Now, a specific embodiment for disposing and fixing the half mirrors 81, 82, total reflection mirror 83 and two-dimensional image display device 70 in predetermined positions shown in FIGS. 1 and 2 will be described. It should be noted that the basic dimensional ratios, transmittance and reflectance of the half mirrors 81, 82 and total reflection mirror 83 are the same.

(1) First Embodiment

FIG. 3 is an exploded perspective view which shows the overall structure of the three-dimensional image display device according to the first embodiment of the present invention. However, this view does not include the two-dimensional image display device 70. With reference to FIG. 3, a mirror device 80 is composed of a mirror case 2, half mirrors 11, 12, and a total reflection mirror 13. The mirror device 80 can be combined with a main body case 3.

The main body case 3 is in the form of a container into which the two-dimensional image device 70 perfectly fits, and includes a pair of shaft receiving holes 3k for combining the main body case 3 with the mirror case 2 and a pair of V-shaped projections 3i for stabilizing the position of the mirror case 2.

The mirror case 2 is for fixing the half mirrors 11, 12 and total reflection mirror 13 in predetermined positions, and functions to combine with the main body case 3. The mirror case 2 is provided with a pair of approximately fan-shaped holes (shaft holes) 2a, 2b, 2c for fixing the half mirrors 11, 12 and total reflection mirror 13, a pair of stoppers 2d, 2f, 2h, and a pair of claws 2e, 2g, 2i on its both sides, and is also provided with a pair of pivots 2k for combining with the main body case and a pair of mountain-shaped projections 2j for stabilizing the positions of the mirror case 2 and main body case 3. The materials of the main body case 3 and mirror case 2 are preferably elastic synthetic resins such as polypropylene, polycarbonate, ABS resins, styrole resins, and rigid PVC.

The half mirrors 11, 12 and total reflection mirror 13 are in the form of approximate rectangles having rectangular shafts 11a, 12a, 13a on both sides of their one side so that the shafts can be inserted into the approximately fan-shaped holes (shaft bearing holes) 2a, 2b, 2c which are formed on the mirror case 2. The thicknesses of the half mirrors 11, 12 and total reflection mirror 13 are preferably 1 mm to 2 mm when the length of the diagonal of the screen 71 is about 3.5 inches.

When the screen 71 is about 10 inches, it is preferably 2 mm to 3 mm. When the screen 71 is about 30 inches, it is preferably 3 mm to 5 mm. The half mirrors 11, 12 and total reflection mirror 13 is preferably made of glass, acrylic resin, rigid PVC, or polycarbonate. Their colors are preferably as clear as possible. The transmittance and reflectance of visible light of the half mirrors 11, 12 are as described above, and the half mirrors 11, 12 are preferably those produced by dielectric multi-layer coating to keep the absorbency of visible light to a low level. The half mirrors 11, 12 are preferably so-called plate beam splitters. The total reflection mirror 13 is preferably produced by dielectric multi-layer coating, but may be of Inconel coating produced by metal vapor deposition.

FIG. 4 the two-dimensional image display device 70 is accommodated in the main body case 3, and shows the state that the mirror device 80 and the main body case 3 are combined. The mirror device 80 is assembled by inserting the shafts of the half mirrors 11, 12 and total reflection mirror 13 into the approximately fan-shaped bearing holes 2a, 2b, 2c of the mirror case 2.

Moreover, by inserting the pivots 2k of the mirror case 2 into the shaft receiving holes 3k of the main body case 3, the mirror device 80 and main body case 3 can be combined (refer to FIG. 12(D)). In the state shown in FIG. 4, the entire screen 71 can be seen, and thus the screen 71 can be normally viewed. However, the half mirrors 11, 12 and total reflection mirror 13 are not in predetermined positions relative to the screen 71, and therefore three-dimensional image viewing is not enabled.

FIG. 5 is a drawing which shows the state that the half mirror 11 rotates about the shaft. FIG. 5(A) is a perspective view of the half mirror 11, while FIG. 5(B) is a side elevational view. With reference to FIG. 5, the shaft 11a of the half mirror 11 is in the form of an outwardly protruding rectangle, having a length of d and a width of W. The length d is equal to the diameter of the approximately fan-shaped shaft receiving hole 2a. The half mirror 11 having the rectangular shafts 11a on its both sides is fixed so that it can rotate about a rotation axis 101 within the range of the angle α of the apex of the approximate fan shape without falling off by nipping the approximately fan-shaped shaft receiving hole 2a (refer to FIG. 3) from both sides. That is, the half mirror 11 is allowed to rotate without deviation from the rotation axis to the position shown by the half mirror 11 of the dotted line. Normally, the shafts of the rotational part have a narrow shape, but considering that the half mirror 11 is made of glass or a synthetic resin, the shafts 11a are formed to be rectangular to increase its strength and reduce the risk of falling off of the shafts. The half mirrors 12 and total reflection mirror 13 are also rotatably fixed by the approximately fan-shaped shaft receiving holes 2b, 2c by the same mechanism.

Figure 6C:
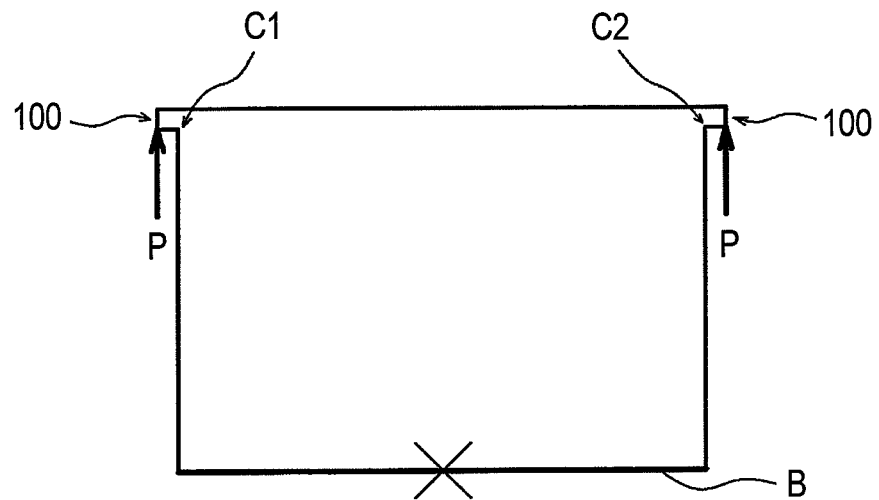
FIGS. 6A-6C are a drawing which explains the strength of the shaft of the mirror.
Figure 6A:
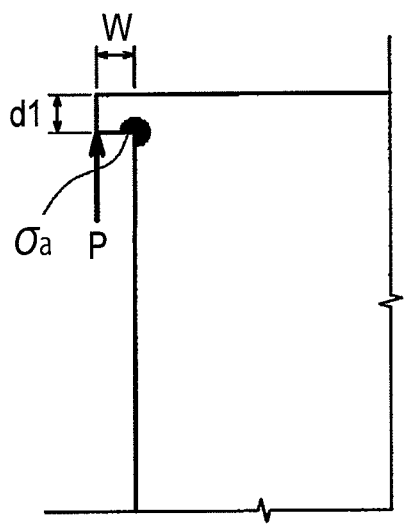
Figure 6B:
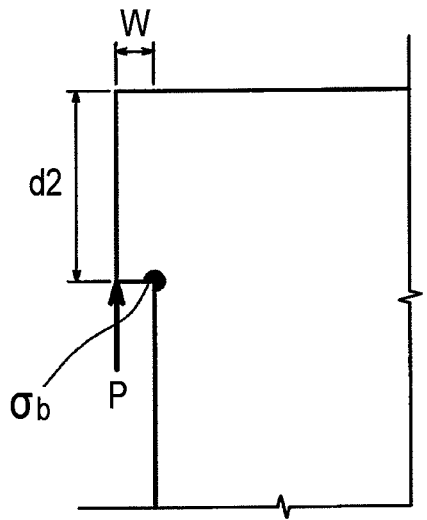
Figure 7:
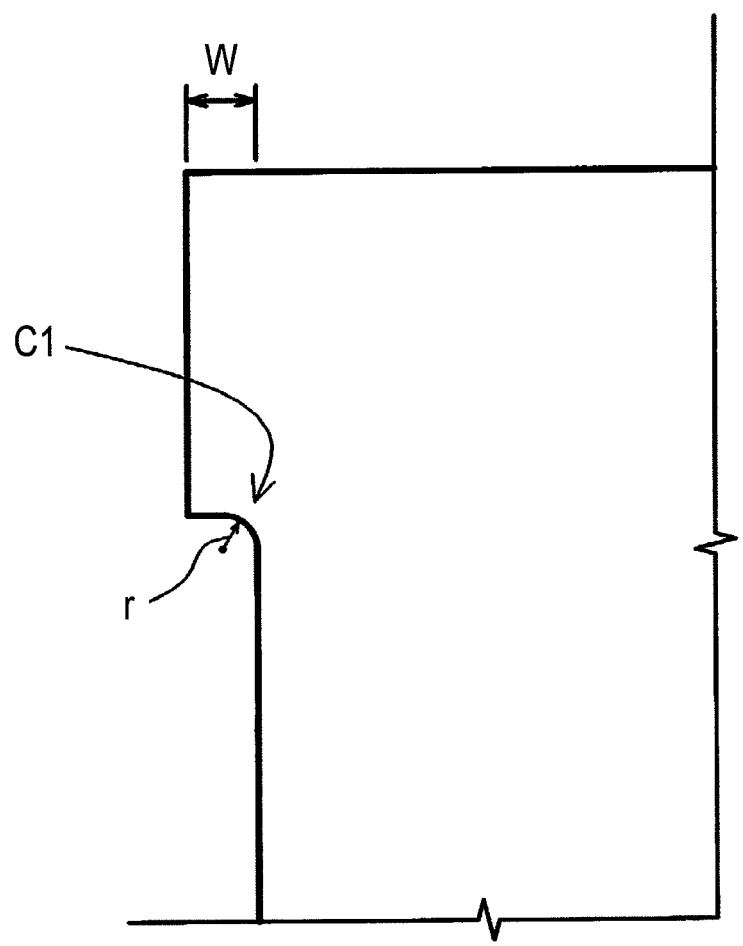
[FIG. 7]

FIGS. 6 and 7 are drawings which explain the strength of the shafts 11a, 12a, 13a of the half mirrors 11, 12, and total reflection mirror 13. FIGS. 6(A)(B) are drawings which show examples with differently shaped shafts d1, d2. The shafts 11a, 12a, 13a all have the shape as an element 100 in FIG. 6(C). In case of such a shape, stress concentration relative to a load often generates in corner parts C1, C2. A plane stress analysis made by the finite element method with base B fixed and a load applied in the position of P indicates that stress concentration of maximum principal stress generates on the corner parts C1, C2.

Normally, the shaft of the rotational part is thin. For example, it is assumed that the maximum principal stress σa of the corner parts in such a shape that width w:length d1=1:1 as shown in FIG. 6(A) is 1.0. In contrast, as shown in FIG. 6(B), by providing a rectangle in which the length of the shape of the shaft is longer by defining that W:d2=1:5, the maximum principal stress ab of the corner parts is about 0.3.

Since the material of the half mirrors 11, 12 and total reflection mirror 13 is glass or synthetic resin, in order to prevent breaking off of the shafts, the stress on the stress concentration part should be reduced as much as possible. To this end, in this embodiment, the stress of the corner parts is reduced by increasing the ratio of the length d2 to the width W of the shaft. It should be noted that the ratio of width W:length d2 is preferably 1:4 or higher, and the ratio 1:5 can reduce the stress of the corner parts to about one third than in the case where 1:1.

FIG. 7 is a drawing which shows a variant of the shape of the shafts. As shown in FIG. 7, by rounding the corner parts C1 and C2 (refer to FIG. 6(C)) in which the shafts of the half mirrors 11, 12, and total reflection mirror 13 are formed, any further stress can be dispersed. In this case, radius r of the round part is preferably one third to one fourth of w.

Rotational movement of the mirror device 80 will be explained.

In the mirror device 80 of FIG. 4, since the half mirror 11 is in a state of engaging the stopper 2d and claw 2e (refer to FIG. 9(A), (B), FIG. 3) provided on the mirror case 2, it is kept from rotating. The half mirror 12 and total reflection mirror 13 are also kept from rotating by the stoppers 2f, 2h, and claws 2g, 2i. (refer to FIG. 9(A)).

Figure 8:
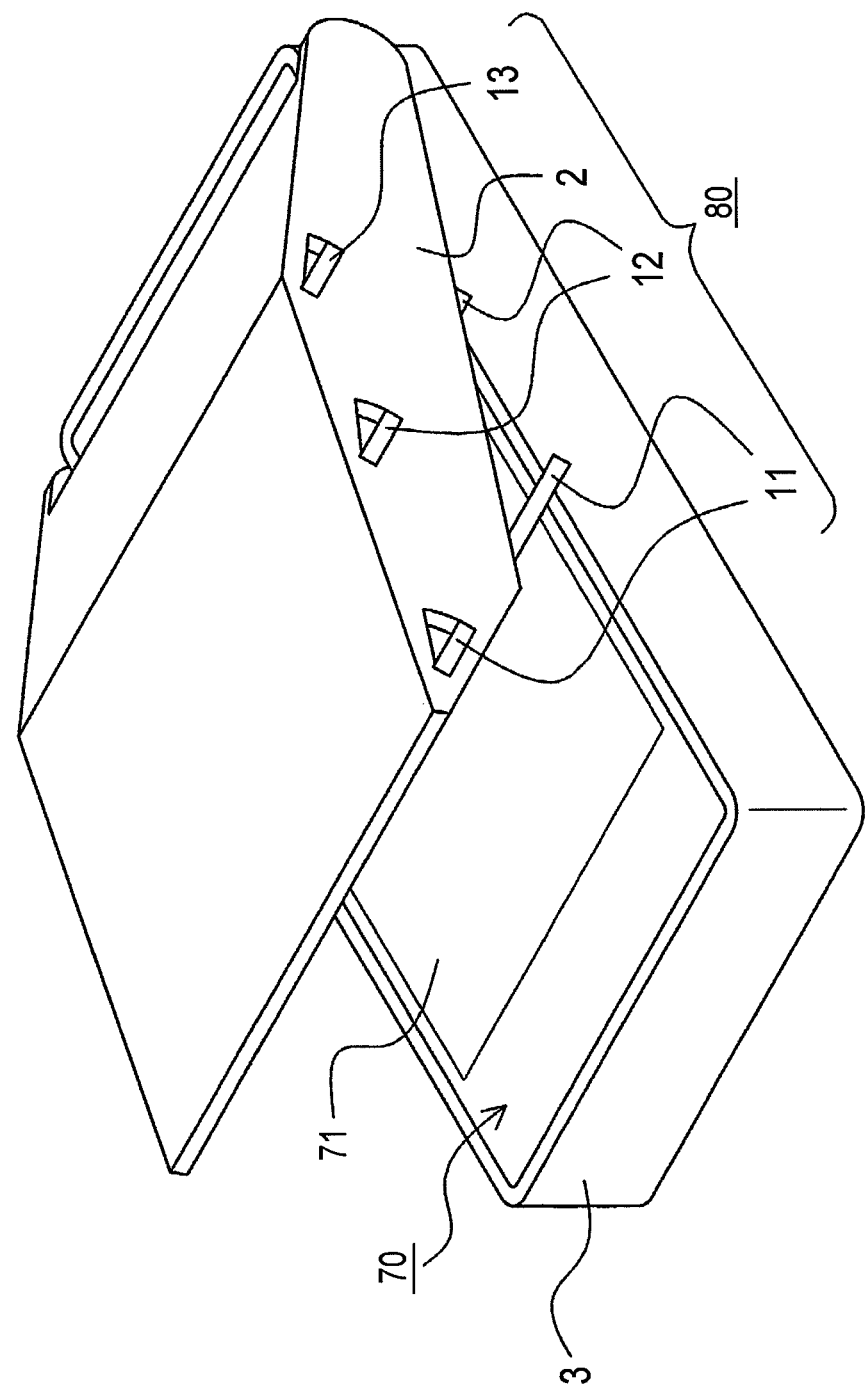
[FIG. 8]

FIGS. 8 and 9 show the state that the mirror device 80 is rotated about the pivot 2k from the state of FIG. 4 and is placed over the main body case 3 into which the two-dimensional image display device 70 is inserted. FIG. 9(A) is a cross-sectional view in part of the three-dimensional image display device during three-dimensional image viewing, FIG. 9(B) is a cross-sectional view of the part shown by arrow B-B in FIG. 9(A), and FIG. 9(C) is a cross-sectional view of the part shown by arrow C-C in FIG. 9(A). The half mirrors 11, 12 and total reflection mirror 13 are in predetermined positions relative to the screen 71 in the state shown in FIG. 9(A), and providing the state for three-dimensional image viewing of this embodiment. The main body case 3 and the shaft receiving hole 3k, the mirror case 2 and pivot 2k, and the approximately fan-shaped holes 2a, 2b, 2c and stoppers 2d, 2f, 2h, and the claws 2e, 2g, 2i are disposed so that the half mirrors 11, 12 and total reflection mirror 13 are in predetermined positions relative to the screen 71 in this state. The angles of apices of the approximately fan-shaped holes 2a, 2b, 2c are about 28 degrees, about 23 degrees, and about 15 degrees, respectively.

In the state of three-dimensional image viewing in FIGS. 8 and 9, as shown in FIG. 9(C), the mountain-shaped projection 2j provided on the mirror case 2 is inserted into a recess of the V-shaped projection 3j of the main body case 3. Accordingly, the positions of the mirror device 80 and main body case 3 are fixed to a certain degree. Since the mirror case 2 and main body case 3 is made of an elastic synthetic resin such as polypropylene, the mountain-shaped projection 2j is removed from the V-shaped projection 3j with a certain amount of force to rotate the mirror case 2 to put it back to the state in FIG. 4. Providing the state in FIGS. 8 and 9 from the state in FIG. 4 is also possible for the same reason. The mirror device 80 can be easily rotated and moved in this manner, and therefore it is possible to easily switch between the state for three-dimensional image viewing and the state for normal viewing of the screen 71 of the two-dimensional image display device 70. When the screen 71 is provided with a touch panel, it is possible to touch the screen in the state shown in FIG. 4.

As mentioned above, in this embodiment, only the part of the mirror device 80 is removed from the screen of the two-dimensional image display device after attachment, whereby it is possible to instantly switch between two-dimensional image viewing and three-dimensional image viewing with easy operation.

Folding of the mirror device 80 will be explained.

FIG. 10 shows the state that the mirrors are folded from the state in FIG. 4 in the mirror case 2. As shown in FIG. 10, the half mirror 11 can be folded at a bottom 2n of the mirror case 2 by going over the claw 2e when force P1 is applied (refer to FIG. 3). The half mirror 12 and total reflection mirror 13 can be folded in a similar manner. FIGS. 11 and 12 show the state that the mirror case 2 in the state of FIG. 10 is placed over the main body case 3. Unlike in the three-dimensional image viewing of FIG. 9, the half mirrors 11, 12 and total reflection mirror 13 are stacked in the mirror case 2, while the mirror device 80 is folded in a state of being close to the main body case 3 and two-dimensional image display device 70. The overall volume is reduced from in the viewing in FIG. 9.

FIG. 12(A) is a cross-sectional view in part when the mirrors are folded, FIG. 12(B) is a cross-sectional view of the part shown by arrow B-B in FIG. 12(A), FIG. 12(C) is a cross-sectional view of the part shown by arrow C-C in FIG. 12(A), and FIG. 12(D) is a cross-sectional view of the part shown by arrow D-D in FIG. 12(A). In this embodiment, as shown in FIG. 12(B), the half mirror 11 is disengaged from the stopper 2d and claw 2e. Moreover, as shown in FIG. 12(C), the mountain-shaped projection 2j is disengaged from the V-shaped projection 3j.

As mentioned above, according to this embodiment, by employing a structure in which the part of the bulky half mirrors can be folded and made compact, a three-dimensional image display device suitable for accommodation and carrying can be provided.

FIG. 13 shows the mechanism that the half mirrors 11, 12 and total reflection mirror 13 are folded within the mirror case 2. FIG. 13(A) is a drawing which shows, assuming that a bottom 2n' of the mirror case 2 is a flat plate with no folding, the state the half mirrors 11, 12 and total reflection mirror 13 are folded within the mirror case, and further placing the mirror case 2 over the main body case 3 is attempted. At this time, its volume in the folded state can be reduced by keeping the height h1 of the bottom 2n' as low as possible when the mirror case 2 is folded from the screen 71. Realization of this, however, requires a rotation axis k' connecting the mirror case 2 and main body case 3 to be in a position remote from the main body case 3, which prevents combination of the two components. If the rotation axis k is disposed within the main body case 3 to allow the two components to be combined as in FIG. 13(B), the height h2 of the bottom 2n' and the screen 71 when folded is about 40% of the height hmax in three-dimensional image viewing. An edge 2W' of the mirror case 2 reaches its maximum height at this time, and this height is the height h2 when folded.

FIG. 13(c) shows the case where the bottom 2n of the mirror case 2 is folded at 2v near an upper end part of the total reflection mirror 13. In this case, causing a bending angle θ to be about 19 degrees brings the screen 71 close to an edge 2W of the mirror case 2, and therefore the position of 2v of the mirror case 2 maximum height, and a height h3 when folded can be about 30% the height hmax during viewing. Moreover, since the position 2v with the maximum height is brought near the center of the bottom 2n of the mirror case 2, a round shape bulging at the center is provided compared with FIG. 13(B), which is suitable for carrying. A space for accommodating the total reflection mirror 13 is left even when the bottom 2n is folded near 2v of the mirror case 2 in such a manner, and thus folding of the total reflection mirror 13 is not affected.

Figure 14:
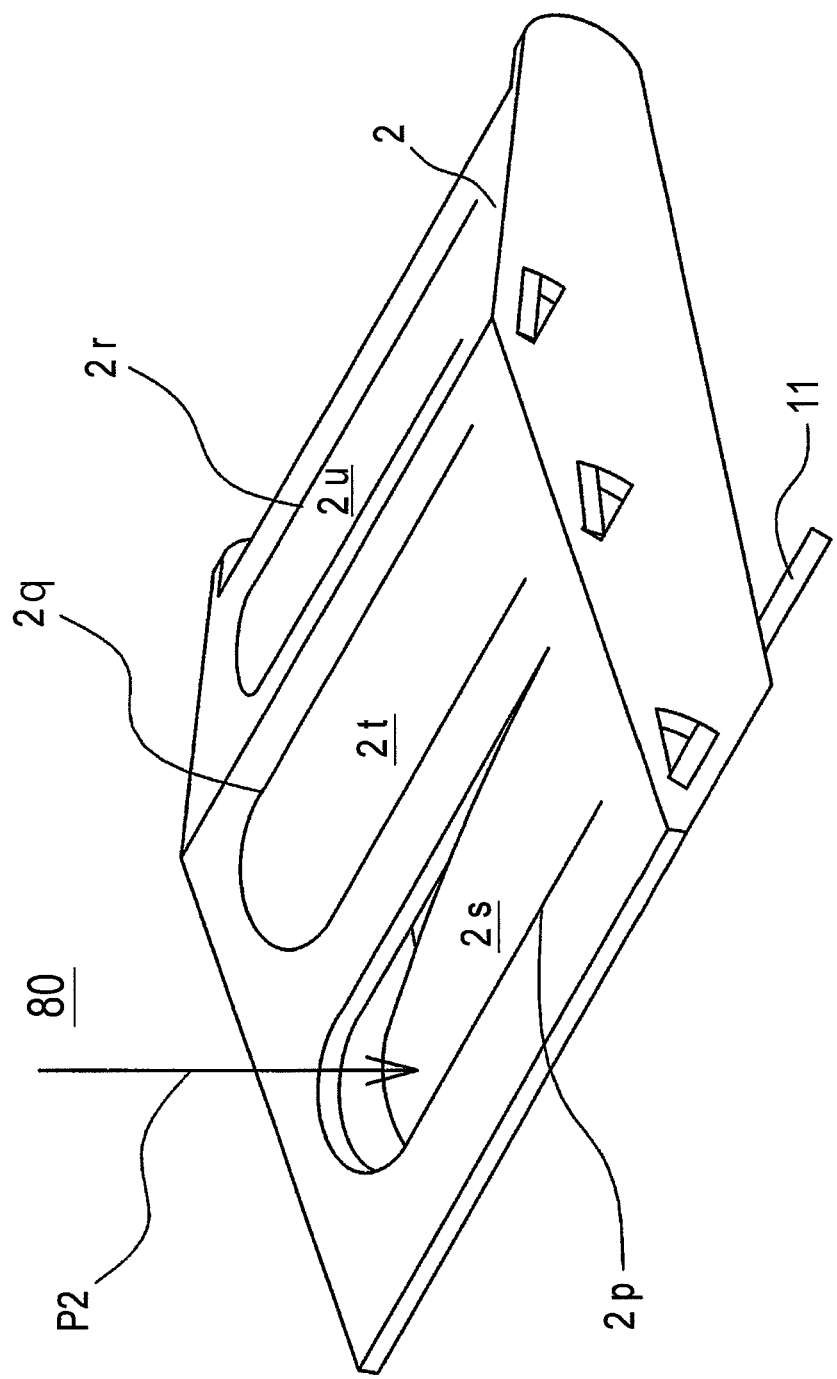
[FIG. 14]

FIG. 14 is a perspective view which shows the top surface of the mirror case. As shown in FIG. 14, U-shaped notches 2p, 2q, 2r are present at the bottom of the mirror case 2. The inner sides of the notches can be warped toward the half mirror 11 by the elasticity of the synthetic resin by applying a force P2 by the finger or hand on an inner part 2*s* the U-shaped notch 2*p*. When this operation is conducted in the state of FIG. 10, the part is pressed relative to the half mirror 11 to push out the same, so that the half mirror 11 can be rotated from the folded state to a position where it is locked between the stopper 2*d* and claw 2*e*. By doing this, the half mirror 11 can be rotated without touching the half mirror 11 directly with the finger or hand. Similarly, the half mirror 12 and total reflection mirror 13 can be rotated by applying a force on the parts 2*t*, 2*u* without directly touching them with fingers or the like.

Figure 15:
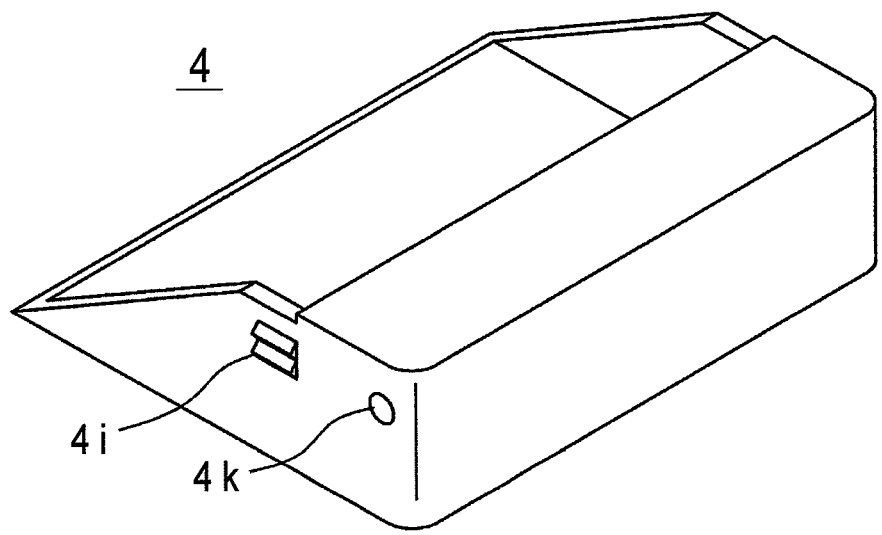
[FIG. 15]
Figure 16:
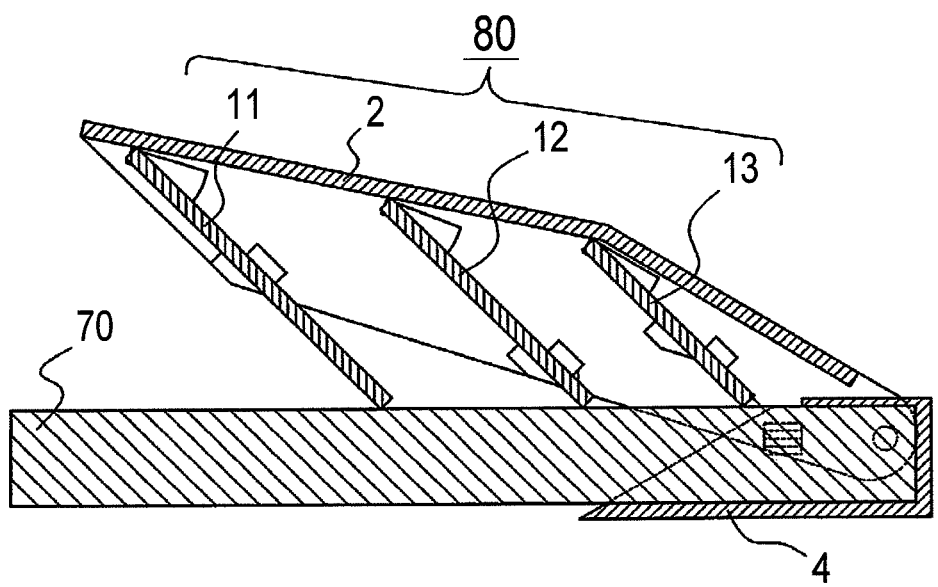
[FIG. 16]

FIG. 15 is a perspective view which shows a main body case 4 having a form different from that of the main body case 3. The main body case 4 has a shape which perfectly fits only an end part of the two-dimensional image display device 70. FIG. 16 is a cross-sectional view of a state that the two-dimensional image display device 70 is inserted into the main body case 4, and the mirror case 2 is combined with the same. It is also preferable that the main body case 4 is also made of an elastic synthetic resin. Moreover, the main body case 4 and two-dimensional image display device 70 are not easily detached due to the friction force. A shaft bearing hole 4*k* and a V-shaped projection 4*j* have functions similar to those of the shaft bearing holes 3*k* and V-shaped projection 3*j* of the main body case 3.

As mentioned above, in this embodiment, a mirror device including half mirrors and other components can be easily attached to and detached from a two-dimensional image display device such as LCD, and the mirror device is designed to be folded and compact. Therefore, a three-dimensional image can be easily carried and enjoyed.

(2) Second Embodiment

Figure 17:
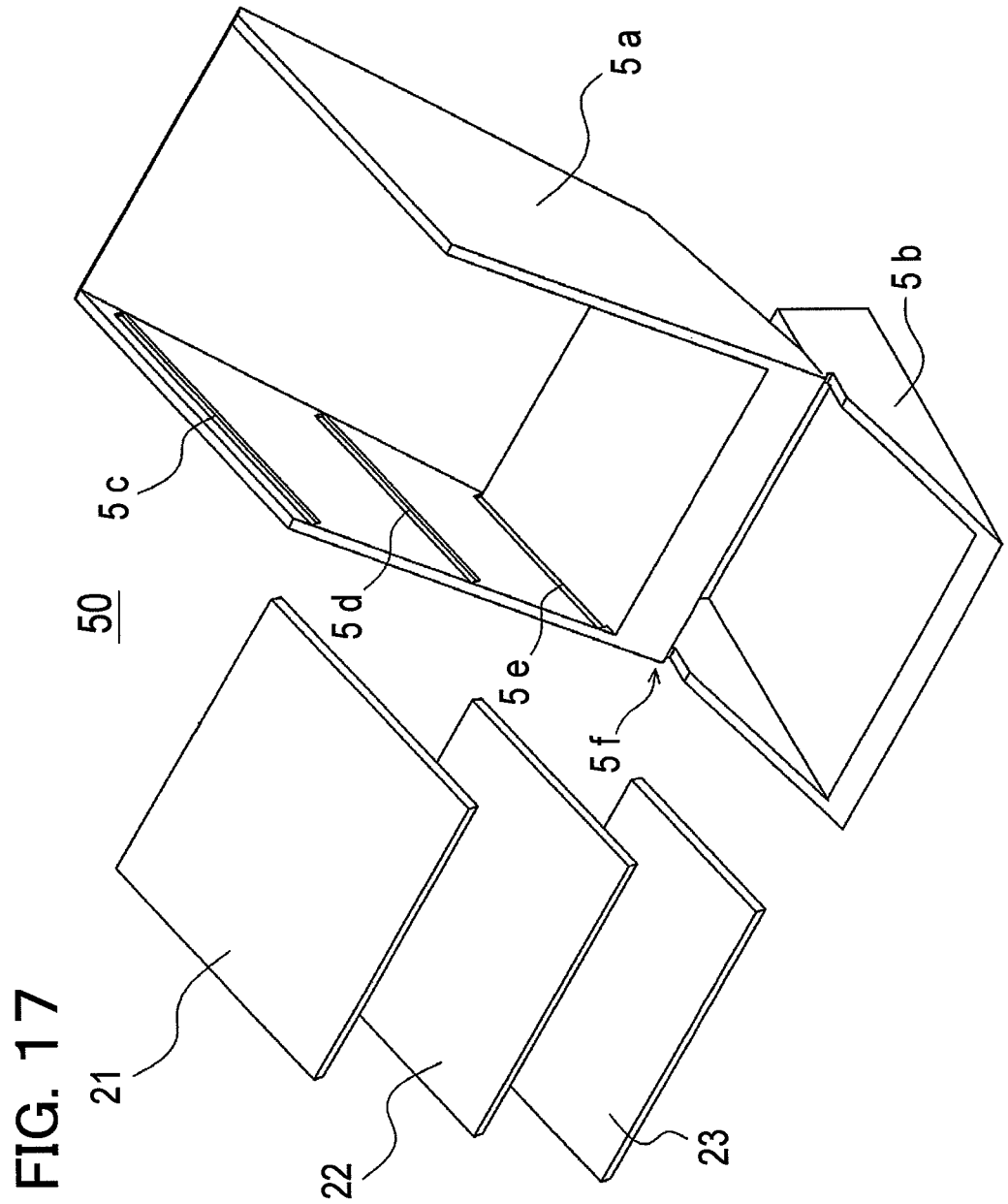
[FIG. 17]

The second embodiment of this invention will be now explained. FIG. 17 is a drawing which shows components of the three-dimensional image display device according to the second embodiment of the present invention. However, this view does not include the two-dimensional image display device. As shown in FIG. 17, a mirror device 50 includes a mirror case 5*a*, half mirrors 21, 22, a total reflection mirror 23 and a main body case 5*b*. Since the mirror case 5*a* and main body case 5*b* are connected by a hinge part 5*f*, it is preferable that it is an integral molding of a synthetic resin of having high resistance to hinging action such as polypropylene by molding.

Grooves 5*c*, 5*d*, 5*e* for fixing and attaching the half mirrors 21, 22 and total reflection mirror 23 are provided on the mirror case 5*a*. The thickness, material, transmittance and reflectance of the half mirrors 21, 22 and total reflection mirror 23 are the same as in embodiment 1, but their shapes are all rectangles.

The main body case 5*b* has a shape that perfectly fits only an end part of the two-dimensional image display device 79.

Figure 18:
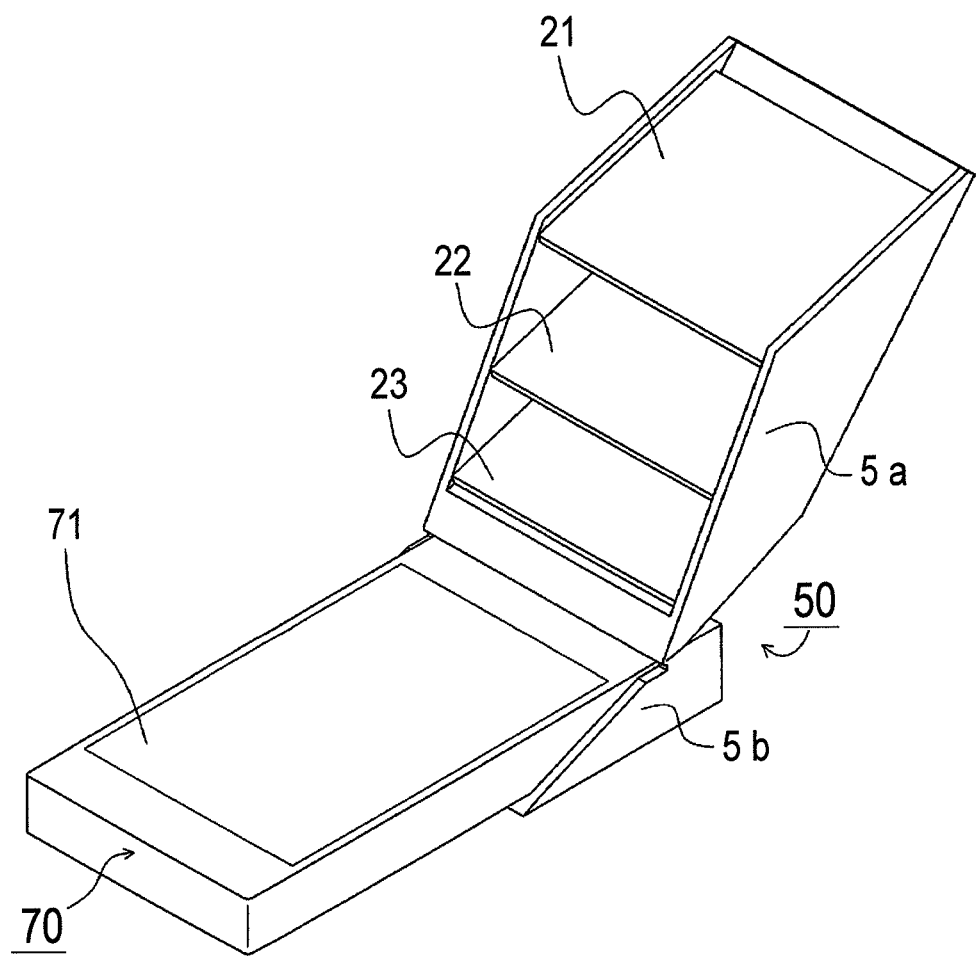
[FIG. 18]
Figure 19:
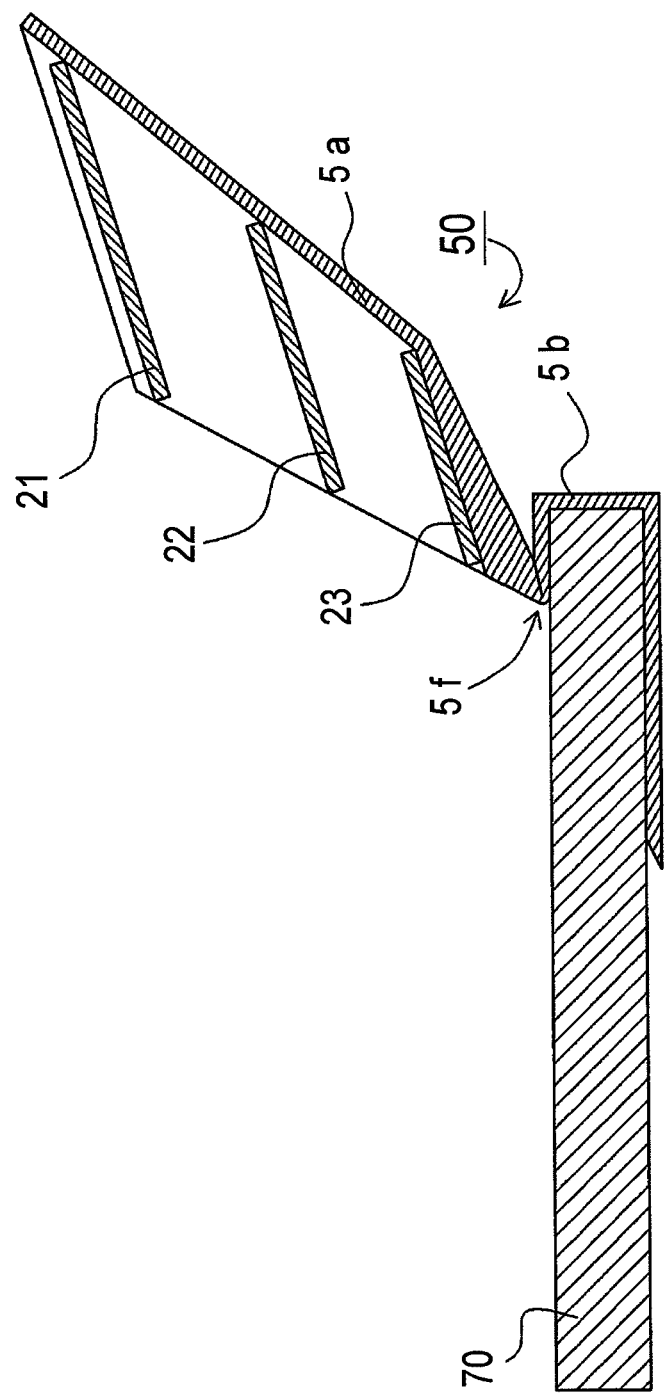
[FIG. 19]

FIGS. 18 and 19 are drawings which show the state that the mirror device 50 is formed by fixing the half mirrors 21, 22 and total reflection mirror 23 to the mirror case 5*a*, and the two-dimensional image display device 70 is inserted into the main body case 5*b*. This is a state for normal viewing of the screen 71 of the two-dimensional image display device 70.

Figure 20:
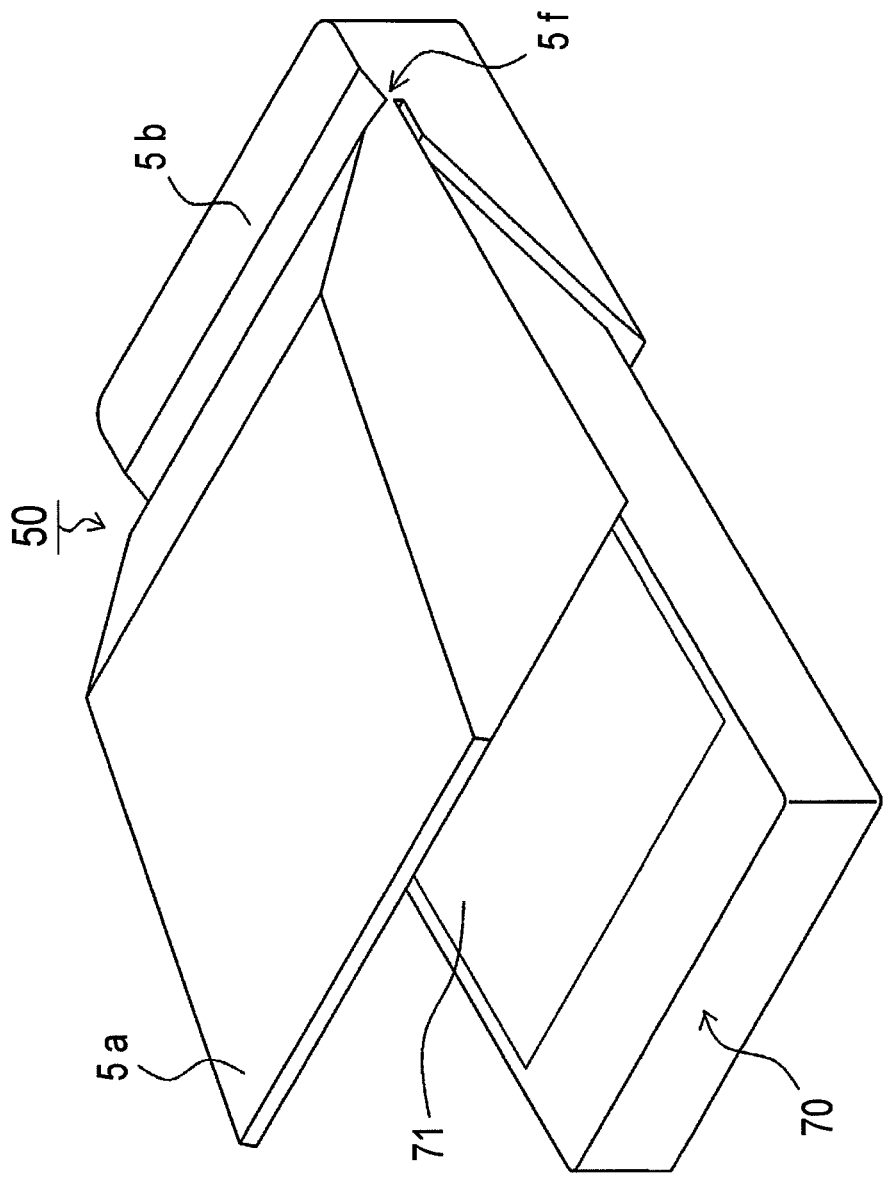
[FIG. 20]
Figure 21:
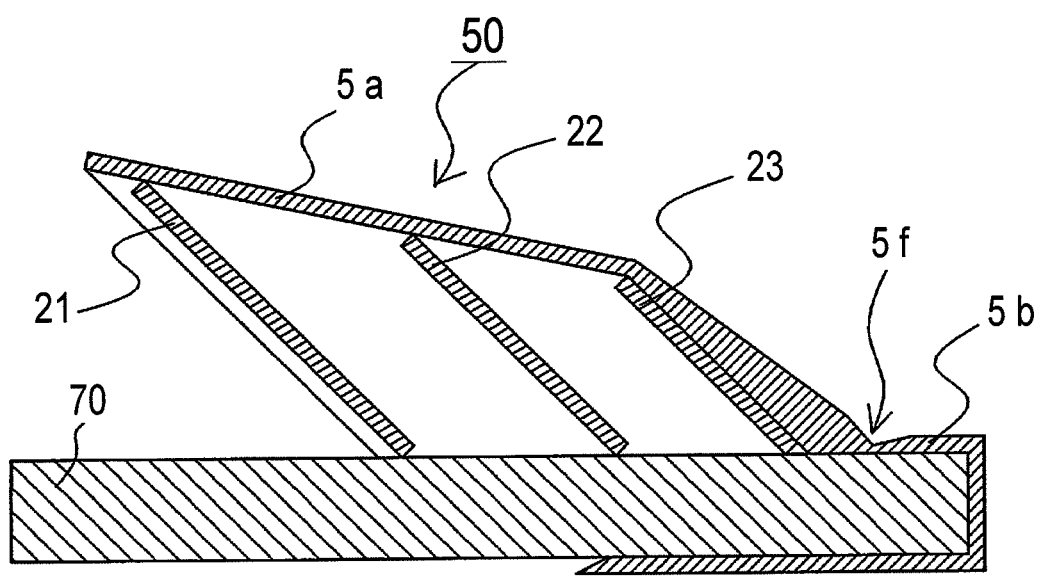
[FIG. 21]

FIGS. 20 and 21 are drawings which show the state that the mirror case 5*a* is rotated about the hinge 5*f* and placed over the screen 71. In this state, the half mirrors 21, 22 and total reflection mirror 23 are brought into predetermined positions relative to the screen 71, and therefore allows three-dimensional image viewing. Since the mirror device 50 can be easily rotated and moved in such a manner, it is possible to easily switch between the state for three-dimensional image viewing and the state for normal viewing of the screen 71 of the two-dimensional image display device 70. When the screen 71 is provided with a touch panel, it is possible to touch the screen in the states of FIGS. 18 and 19.

In the second embodiment, the part of the mirror device 50 cannot be folded to reduce the volume as in the first embodiment. However, the second embodiment requires fewer parts than the first embodiment, and the shapes of parts are simpler. Accordingly, it is possible to reduce production costs than the first embodiment.

It should be noted that the second embodiment can be carried out with various modifications. For example, in the above embodiment, the mirror case 5*a* has a structure of being rotatable about the hinge 5*f*, but may have a structure that the mirror case 5*a* and main body case 5*b* are integrally fixed without providing the hinge 5*f*. To attach the two-dimensional image display device 70 to the main body case 5*b*, the two-dimensional image display device 70 can be attached by inserting from the front of the main body case 5*b*.

As mentioned above, in the second embodiment, a mirror device including half mirrors and other components can be easily attached to and detached from a two-dimensional image display device such as LCD, enabling enjoyment of three-dimensional images.

(3) Third Embodiment

Specific constitutional examples of the three-dimensional image display device now will be explained with reference to FIG. 22 and the following drawings. It should be noted that the basic proportion of the half mirrors and total reflection mirror and other conditions are the same as those in FIGS. 1 to 2.

Figure 22:
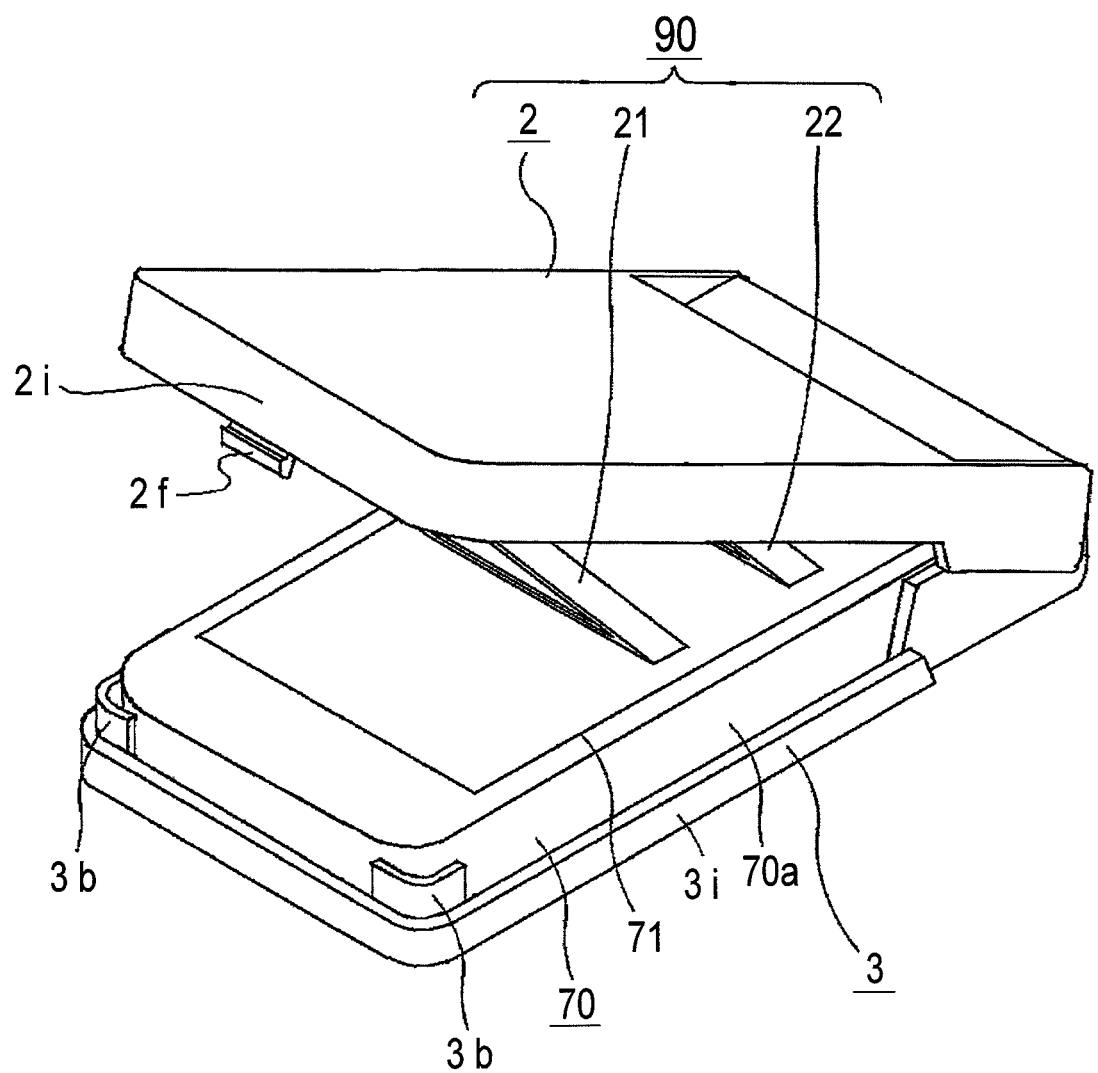
[FIG. 22]
Figure 23:
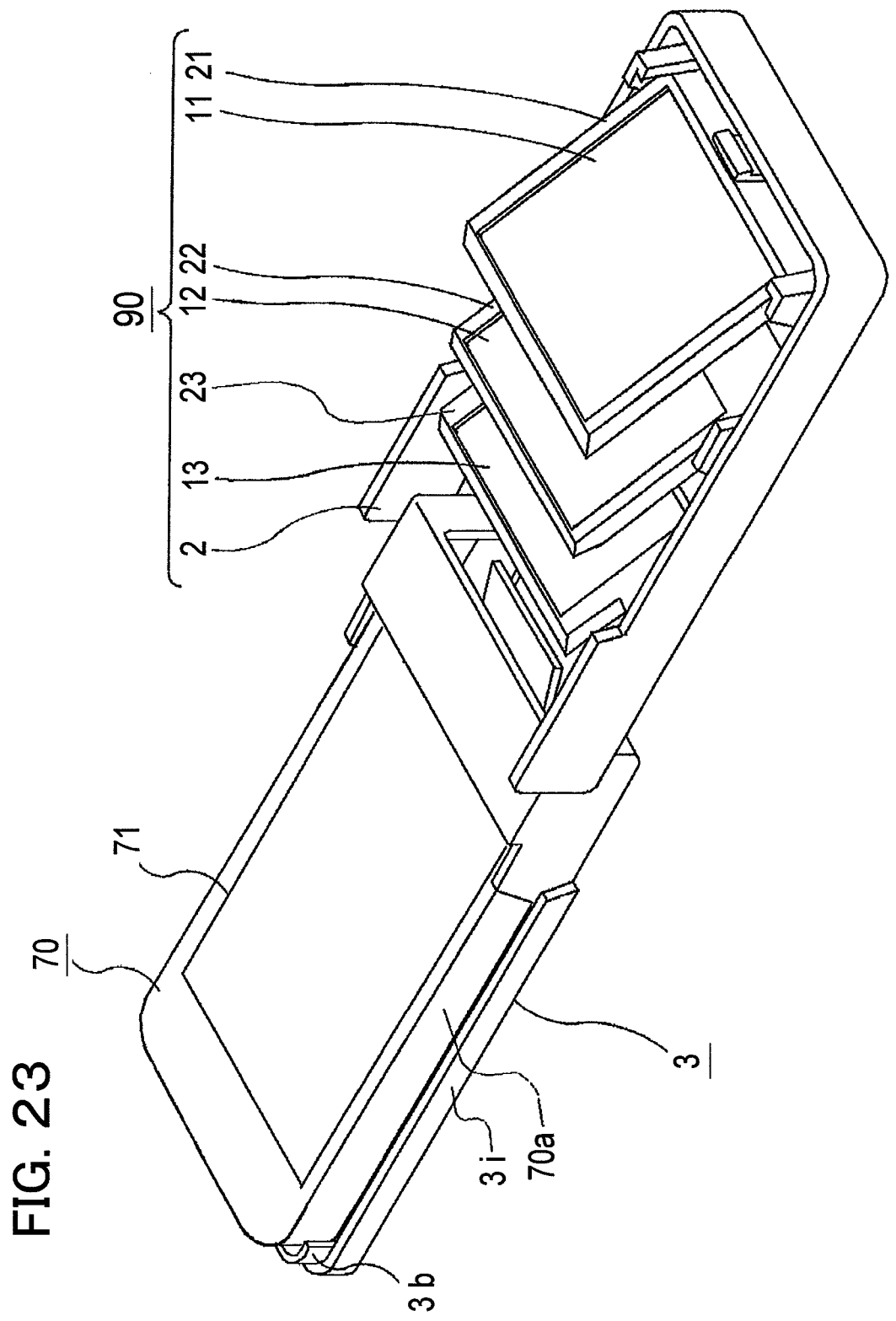
[FIG. 23]
Figure 24:
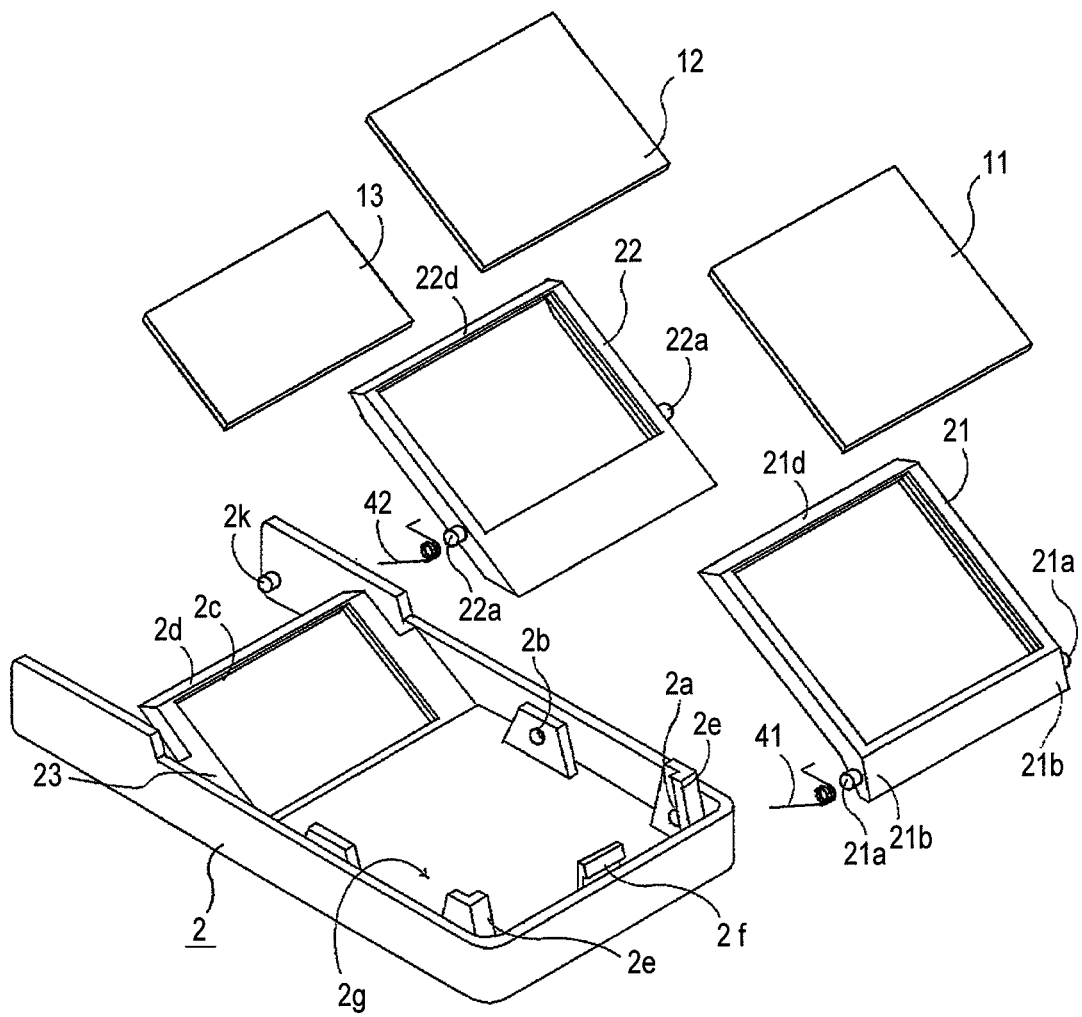
[FIG. 24]
Figure 25:
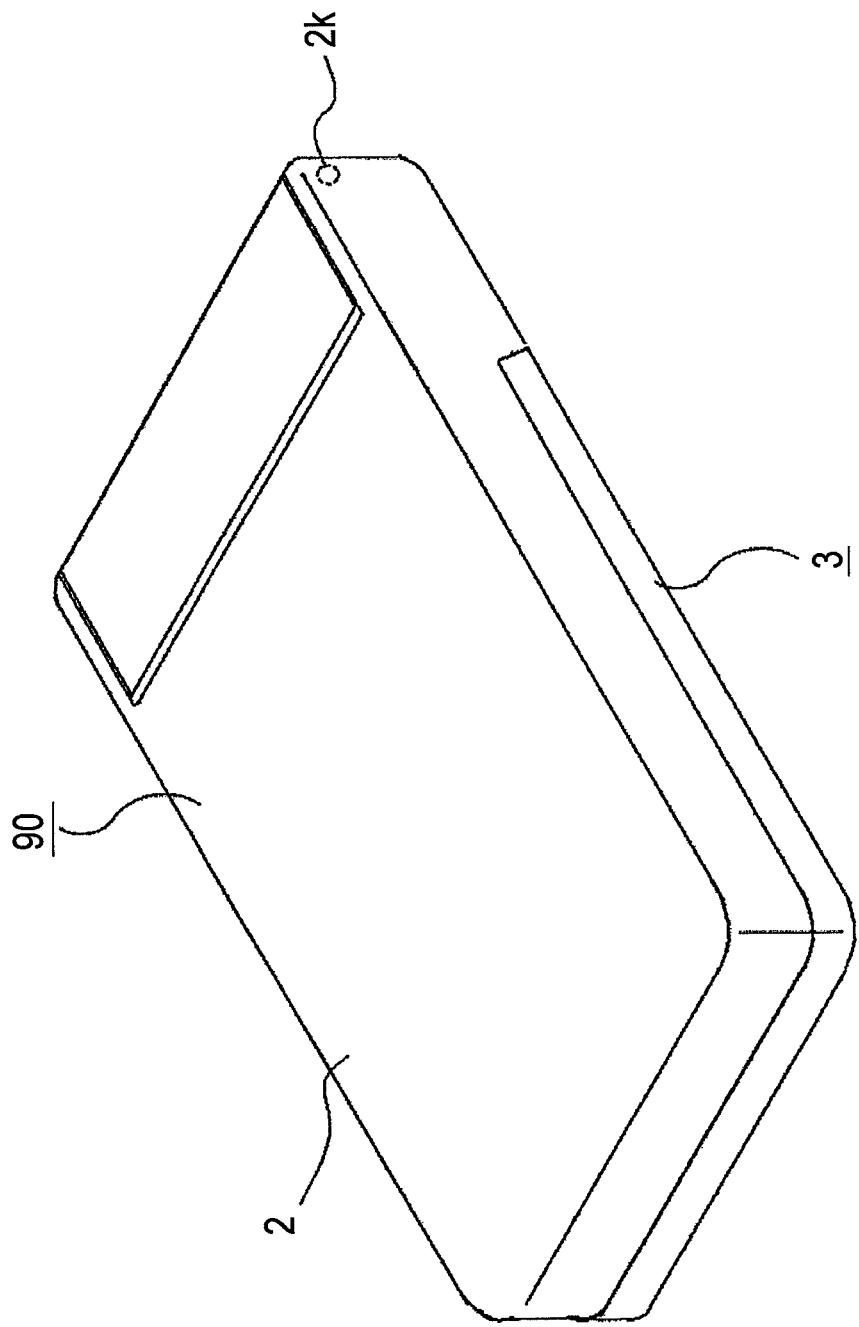
[FIG. 25]
Figure 26:
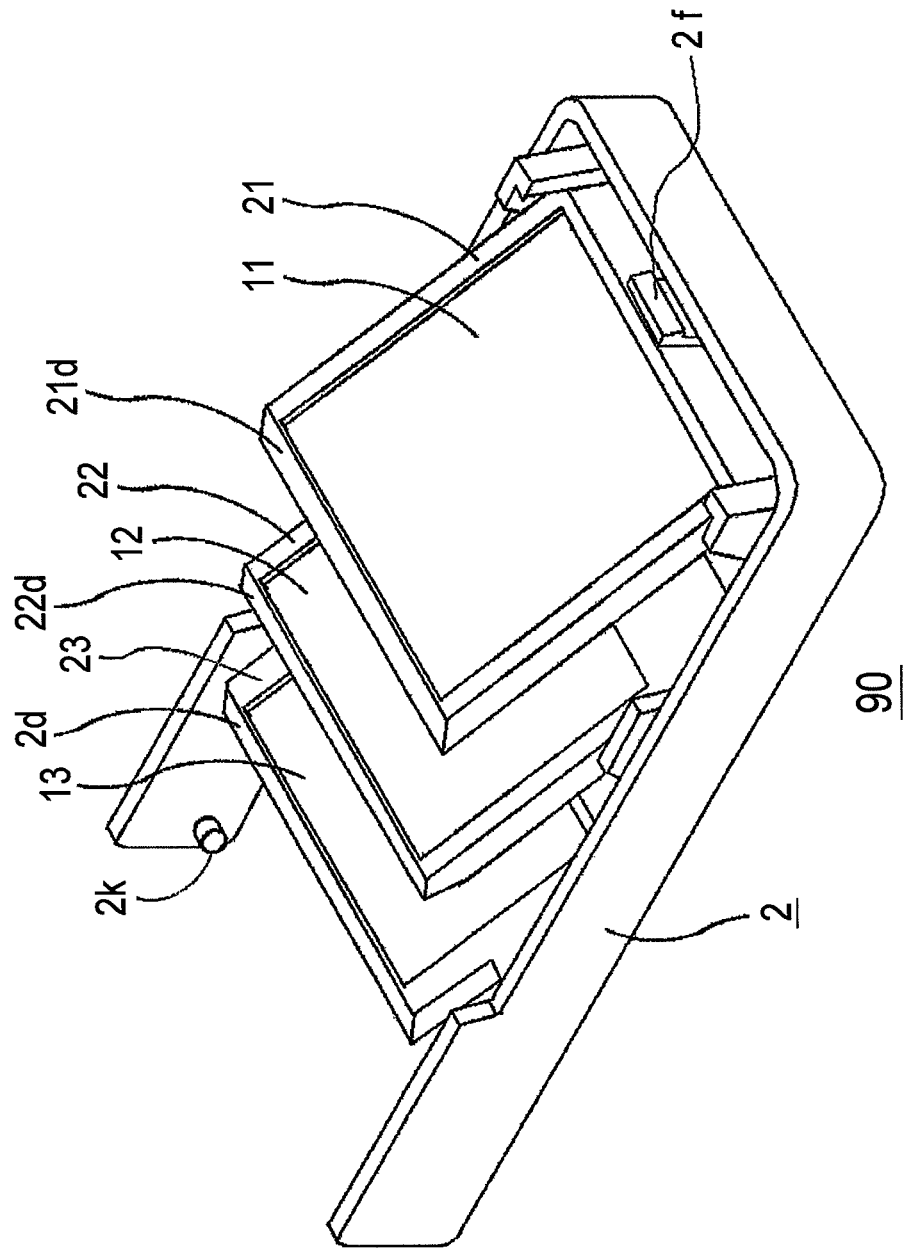
[FIG. 26]

FIG. 22 is a perspective view of the three-dimensional image display device in a state that three-dimensional image viewing is allowed, FIG. 23 is a perspective view of the three-dimensional image display device in a state that two-dimensional image viewing is enabled on the screen of the two-dimensional image display device in a state that the mirror device is open, FIG. 24 is an exploded perspective view of the mirror device, FIG. 25 is a perspective view of the three-dimensional image display device in a state that the mirror device is closed, and FIG. 26 is a perspective view of the mirror device.

As shown in FIG. 25, the three-dimensional image display device includes a mirror device 90 and a main body case 3. As shown in FIG. 22, the main body case 3 has an approximately box shape, and accommodates a two-dimensional image display device 70 therein. The two-dimensional image display device 70 is, for example, a smart phone. The mirror device 90 includes an approximately box-shaped mirror case 2 in which a plurality of mirrors (three mirrors in this example) are arranged and mounted in parallel at predetermined intervals in the depth direction, and this mirror case 2 and its shaft 2*k* are rotatably supported by shaft bearing 3*k* (refer to FIGS. 27 and 28) in rear end parts of the main body case 3. FIG. 23 shows a state when the mirror case 2 is rotated and fully open from the main body case 3. Moreover, as shown in FIG. 25, in a state that the mirror case 2 is closed within the main body case 3, the three-dimensional image display device forms a single box shape, and therefore it is compact and convenient for accommodation in a bag or easy carrying.

As shown in FIGS. 22 to 27, the main body case 3 is surrounded by a flange (low side wall) 3*i*, and is provided with a housing part 3*m* surrounded by the flange 3*i* at its center. The two-dimensional image display device 70 including the screen 71 which displays a two-dimensional image is removably attached to this housing part 3*m*. A pair of guide walls 3*b* for preventing the two-dimensional image display device 70 from moving to the front and falling out is provided on the front left and right side. It should be noted that the details of the main body case 3 will be described later with reference to FIGS. 27 to 28.

the structure of the mirror device 90 will be now described in further detail.

With reference to FIG. 23, from the front to the back, two half mirrors 11, 12 and a total reflection mirror 13 are mounted on the mirror case 2. Two quadrangular half mirrors 11, 12 are attached to quadrangular mirror frames 21, 22 in a manner of being embedded, and the quadrangular total reflection mirror 13 is attached to a quadrangular mirror frame 23 similarly. The widths of the quadrangular shapes of the plurality of mirrors 11, 12, 13 (long side in the example illustrated) are the same, while the other sides (short sides) get shorter as they go back (further from the view). Herein, it is preferable that the mirror case 2 and mirror frames 21, 22, 23 are formed of an elastic synthetic resin, for example, ABS, polycarbonate, polypropylene and like materials.

Now, with reference to the exploded perspective view of FIG. 24, the assembly structure of the mirror device 90 will be explained.

The half mirrors 11, 12 are embedded into the mirror frame 21, 22, respectively, and the total reflection mirror 13 is embedded into and attached to the mirror frame 23 which is a part of the mirror case 2. The mirror frame 21 has a pair of shafts 21*a*. The pair of shafts 21*a* is attached to a pair of shaft bearing parts 2*a* provided on the mirror case 2 in a state that a torsion coil spring 41 is engaged with one of the shaft 21*a*. The mirror frame 22 having the half mirror 12 inserted thereinto similarly is attached to a pair of shaft bearing parts 2*b* provided on the mirror case 2 in a state that the torsion coil spring 42 is engaged. It should be noted that the shaft bearing parts 2*a*, 2*b* are made of an elastic synthetic resin, and therefore are allowed to be deformed to a certain degree, and the shafts 21*a*, 22*a* of the mirror frames 21, 22 can be inserted thereinto.

Figure 29:
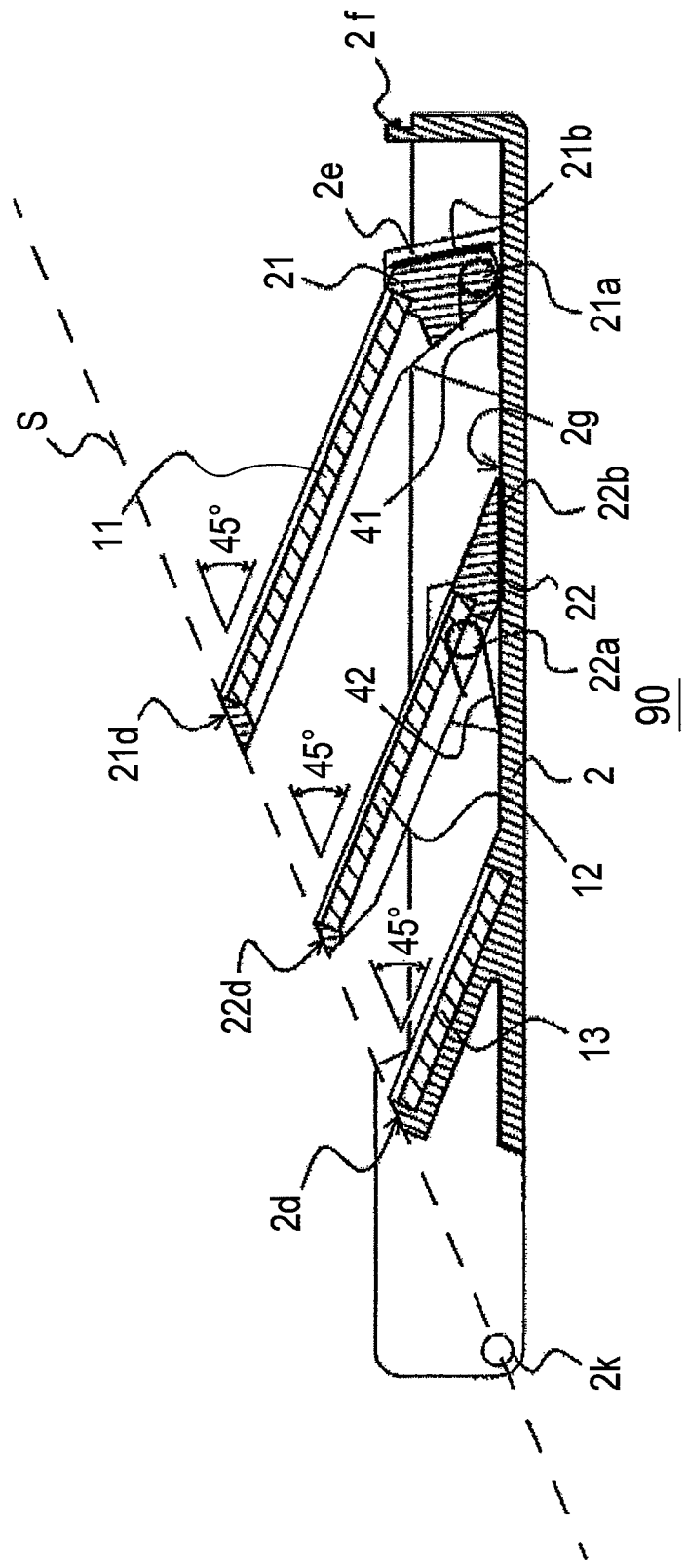
[FIG. 29]

In such a manner, in the mirror frames 21, 22 to which the half mirrors 11, 12 are attached, a force which rotates the mirror frames 21, 22 acts in the direction of opening the mirror frames 21, 22 about the shafts 21*a*, 22*a* by the acting force of the torsion coil springs 41, 42, and front ends 21*d*, 22*d* of the mirror frames are fitted onto the surface of the screen 71 of the two-dimensional image display device (refer to FIGS. 29 and 31 for details). In contrast, the mirror frame 23 having the total reflection mirror 13 attached thereto is integrally molded with the mirror case 2, and does not rotate. In this state, the front end 2*d* of the mirror frame 23 forms the face (S in FIG. 29) which comes in contact with the screen 71 as the front ends 21*d*, 22*d* of the mirror frames.

FIG. 26 shows a perspective view of the mirror device 90 after been assembled.

A pair of shafts 2*k* is provided at the rear end of the mirror case 2, and these shafts 2*k* engage a pair of shaft bearings 3*k* provided on the main body case 3 to constitute an assembly in which the mirror device 90 and main body case 3 are combined. The mirror devices 90 and mirror case 2 are rotatable about the shafts 2*k* relative to the main body case 3.

FIG. 22 shows the state that a two-dimensional image displayed on the screen 71 of the two-dimensional image display device 70 while the two-dimensional image display device 70 is accommodated in the housing part 3*m* of the main body case 3 is reflected by the mirrors 21 to 23 to show a three-dimensional image to the viewer. Moreover, FIG. 23 shows the state that a normal two-dimensional image can be viewed displayed on the screen 71 of the two-dimensional image display device 70 while the two-dimensional image display device 70 is similarly accommodated in the housing part 3*m* of the main body case 3 and the mirror device 90 is rotated to open the screen 71. The three-dimensional image cannot be viewed in this state. It should be noted that when the screen 71 such as a smart phone has a touch panel function, and the screen 71 can be freely touched with the finger or the like while the two-dimensional image is viewed.

FIG. 29 is a sectional side elevational view of the mirror device.

With reference to FIG. 29, the operation and action of the mirror frames 21, 22 will be explained. The mirror frame 21 is in a state of being rotatable in a certain range using the shaft 21*a* as the center axis. However, a turning force is applied on the mirror frame 21 by the force of the torsion coil spring 41 and the end part 21*b* is in a state of being in contact with the stopper 2*e*. In this state, when no force is applied on the mirror frame 21, the mirror frame 21 keeps this position relative to the mirror case 2. Moreover, when a certain amount of force is applied on the mirror frame 21 (that is, when the mirror case is closed inside the main body case 3), the mirror case gives in to the repulsive force of the torsion coil spring 41, and the end part 21*d* of the mirror frame 21 rotates towards the mirror case 2.

The mirror frame 22 is also in a state similar to the mirror frame 21. In the case of the mirror frame 22, however, the end part 22*b* is in contact with a bottom face 2*g* of the mirror case 2. When a certain level of force is applied on the mirror frame 22, it also rotates the end part 22*d* of the mirror frame 22 toward the mirror case 2. It should be noted that the torsion coil springs 41, 42 may be engaged with parts other than the shafts 21*a*, 22*a*.

In the state of FIG. 29, the end part 21*d* of the mirror frame 21, the end part 22*d* of the mirror frame 22, and the end part 2*d* of the mirror frame 23 are on the same plane S (that is, screen 71). In addition, the center of a pair of shafts 2*k* of the mirror case 2 is also on the same plane S. Moreover, the reflection surface of the half mirror 11, 12 and of the total reflection mirror 13 are parallel with each other while staying at an angle of 45° relative to the plane S.

The reason for providing the end part 21*d* of the mirror frame 21 at an angle of 45° relative to the reflection surface of the half mirror 11 is to, when the end part 21*d* comes into contact with on the screen 71 of the two-dimensional image display device 70, cause the end part 21*d* to be contact with as wide an area as possible with the screen 71 of the two-dimensional image display device 70, so as to prevent the half mirror 21 made of glass from damaging the screen 71.

Figure 27:
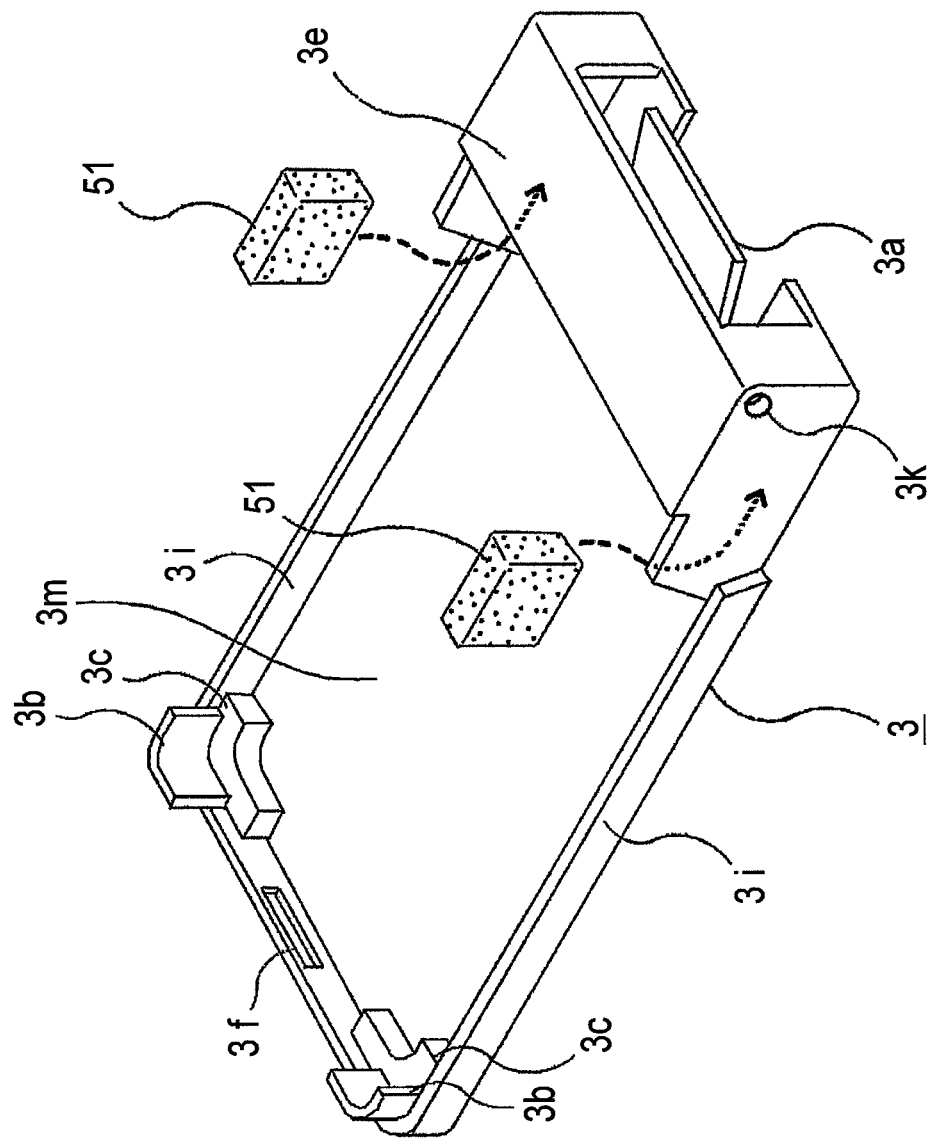
[FIG. 27]
Figure 28:
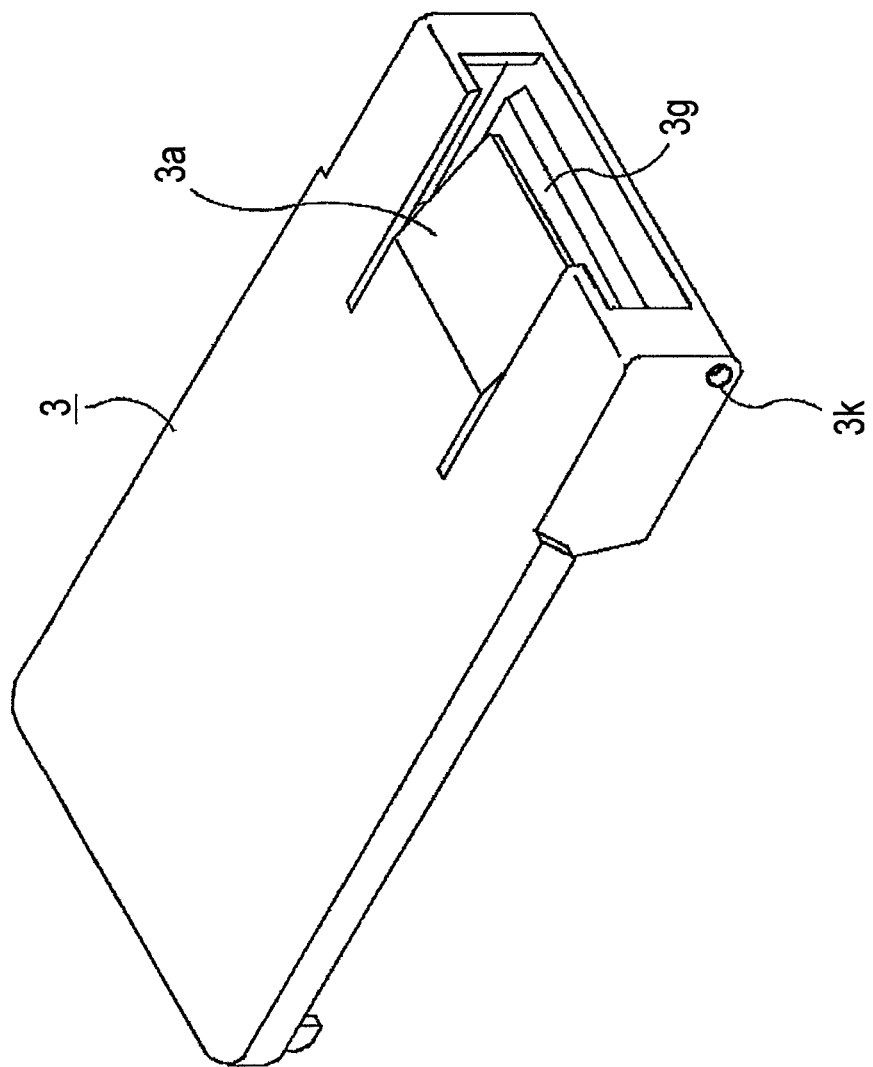
[FIG. 28]

With reference to FIGS. 27, 28 and 30, the structure of the main body case 3 will be described in detail.

A socket part 3*e* into which a front head part of the two-dimensional image display device 70 is inserted is provided in an inner part of the main body case 3. Furthermore, a flat spring part 3*a* which is notched in part and bending and extending within the socket part 3*e* is provided at the bottom of the main body case 3 opposing the socket part 3*e*. These components are integrally formed with the main body case 3 and made of synthetic resin.

A pair of soft components 51 including, for example, sponge and rubber, are arranged on the inner left and right sides of the socket part 3*e*. FIG. 30 shows the arrangement positions of the soft components 51. It should be noted that FIG. 30(A) is a longitudinal sectional view, (B) is a plan view, and (C) is a cross-sectional view. The reason that the pair of soft components 51 are arranged on the inside of the socket part 3*e* is that several kinds of the two-dimensional image display devices 70 having different widths are accepted and the difference in width is absorbed by these soft components 51.

As shown in FIG. 30(A), the reason for providing the flat spring part 3a at the bottom of the main body case 3 is that several kinds of the two-dimensional image display devices 70 having different heights are accepted between the flat spring part 3a and the inside of the socket part 3e of the main body case 3, and the screen 71 is always in contact with a reference plane 3g by the elastic force of this flat spring part 3a. Moreover, the pressure of the flat spring 3a retains the two-dimensional image display device 70 so that it does not easily fall off from the socket part 3e.

A shaft bearing 3k for rotatably attaching the shaft 2k of the mirror device 90 is provided at the rear end part of the main body case 3. As shown in FIG. 30(A), the shaft bearing 3k is on the same plane R as the reference plane 3g. Moreover, the end parts 21d, 22d, 2d and shaft 2k of the mirror frames of FIG. 29 are on the same plane S. When the mirror device 90 rotates relative to the main body case 3 about the shaft 2k, this plane S simultaneously rotates, and as shown in FIG. 31(A), the plane R and plane S coincide. Since the screen 71 of the two-dimensional image display device 70 is in contact with the reference plane 3g, the end parts 21d, 22d, 2d of the mirror frames are brought into close contact with the screen 71. In such a manner, a three-dimensional image can be displayed to the viewer in a state that the half mirrors 11, 12 and total reflection mirror 13 are positioned with high accuracy relative to the screen 71.

FIG. 31 is a cross-sectional view seen from three directions of the three-dimensional image display device in a state that the two-dimensional image display device 70 is accommodated in the main body case 3 and three-dimensional image viewing is enabled using the mirror device 90.

When the two-dimensional image display device 70 is inserted into the socket part 3e of the main body case 3, the pair of soft components 51 becomes small to fit the width shape of the two-dimensional image display device 70 and presses the two-dimensional image display device 70 at a certain pressure. Since the soft components 51 have a certain level of friction, they prevent the two-dimensional image display device 70 from easily falling off from the socket part 3e of the main body case 3.

Moreover, a pair of approximately L-shaped walls 3b (FIGS. 30 to 31) provided to the front of the main body case 3 prevents the two-dimensional image display device 70 from easily falling off from the main body case 3. Herein, the walls 3b are placed in such positions that accept sizes which are slightly larger in width and length of the two-dimensional image display device 70.

In FIGS. 31(A) and (C), the flat spring 3a of the main body case 3 presses the two-dimensional image display device 70 against the reference plane 3g at a certain level of pressure, and the end part of the screen 71 is always in contact with the reference plane 3g.

Moreover, as shown in FIG. 31(A), even when the three mirror frames 21, 22, 23 are in the state of displaying a three-dimensional image, the mirror frame 23 and mirror case 2 are integrally formed, and an apex P (maintaining angle β) of the combination of the end part 2d, shaft 2k, mirror frame 23 and mirror case 2 is in the state of three-point mounting and is secure. Therefore, the mirror case 2 does not transmit an external force on the mirror frames 21, 22 in the state of being disposed parallel with each other. Accordingly, even when an external force is applied from outside the mirror case 2, the mirror frames 21, 22 in the state of being disposed parallel with each other and displaying a three-dimensional image can be prevented from being folded.

FIG. 32 shows the case where a two-dimensional image display device 80, which has a size different from the two-dimensional image display device 70 shown in FIG. 31, is attached to the main body case 3.

In this example, the dimensions Ws2, Ds2, Ts2 of the two-dimensional image display device 8 in FIG. 32 are all slightly smaller than those Ws1, Ds1, Ts1 of the two-dimensional image display device 70 in FIG. 31. As shown in FIG. 32(B), (C), the soft components 51 retain the two-dimensional image display device 80 at a sufficient pressure from its width direction. Moreover, the flat spring 3a of the main body case 3 presses the two-dimensional image display device 80 against the reference plane 3g at a certain pressure, and the end part of the screen 81 is always in contact with the reference plane 3g. Since the soft components 51 have a certain level of friction, the two-dimensional image display device 80 is prevented from easily falling off from the socket part 3e of the main body case 3.

Moreover, the pair of approximately L-shaped walls 3c shown in FIGS. 30 and 31 prevents the two-dimensional image display device 80 from falling off from the main body case 3. It should be noted that the walls 3c are is placed at positions which allow a device that is slightly bigger than the two-dimensional image display device 80. Furthermore, there are steps between the guide walls 3b and walls 3c, the differently sized two two-dimensional image display devices 70, 80 can be both accepted.

In the example of FIG. 31(A), the bottom 3h of the main body case 3 and the screen 71 are parallel with each other, while in the example of FIG. 32 (A, the thickness Ts2 of the two-dimensional image display device 80 is small, and therefore the screen 81 forms a slight angle θ with the bottom 3h.

As in FIG. 32, even though the screen 81 forms a slight angle θ with the bottom 3h, the end parts 21d, 22d of the mirror frames 21, 22, the case end part 2d of the mirror frame 23, and the shaft 2k of the mirror case 2 are on the same plane, and the screen 81 is almost in contact with the reference plane 3g. Therefore, the shaft bearing 3k is on the screen 81. In such a manner, the plane S (FIG. 29) formed by the end parts 21d, 22d, and end part 2d is on the same plane as the screen 81, and the half mirrors 11, 12 and total reflection mirror 13 are disposed in predetermined positions relative to the screen 81 with high accuracy.

In such a manner, according to this example, differently sized two-dimensional image display devices can be accommodated in and attached to the main body case 3 by the soft components 51, flat spring 3a, approximately L-shaped walls 3b, 3c, thereby enabling use with various kinds of two-dimensional image display devices. Moreover, when the two-dimensional image display device is a smart phone, it is common that a special case, i.e., a so-called jacket, is attached thereto at all times. Since the special case has a certain thickness, attaching this case increases the size of the two-dimensional image display device. However, according to this example, since differently sized two-dimensional image display devices can be handled, the same two-dimensional image display device can be handled, whether it is put in a dedicated case or not.

Moreover, the positions of the end parts 21d, 22d of the mirror frames 21, 22, the end part 2d of the mirror frame 23, the shaft 2k, the reference plane 3g of the main body case 3, and the shaft bearing 3k are specifically designed, so that the mirrors can be disposed in predetermined positions even when the display surface of the two-dimensional image is attached at an angle in the range of θ relative to the bottom face 3h of the main body case.

When the two-dimensional image display device 70 is removed from the three-dimensional image display device, as shown in FIG. 23, the mirror device 90 is rotated to be open from the main body case 3. The two-dimensional image display device 70 is then taken out from the housing part 3m. In this case, the height of the flange 3i of the main body case 3 is designed to be lower than the heights of several models of the two-dimensional image display device 70, 80, a side face 70a of the two-dimensional image display device 70 is exposed from the flange 3i. Accordingly, the side face 70a can be picked by the finger to easily remove the two-dimensional image display device 70 from the main body case 3. This is the case with the two-dimensional image display device 80 having a different dimension.

Now, with reference to FIG. 33, the case of the three-dimensional image display device when the three mirrors are folded will be explained. The mirror frames 21, 22 are rotated about the shafts 21a, 22a, respectively, and folded on top of the other inside the mirror case 2. When the mirror frames 21, 22 are folded, they are accommodated between the mirror case 2 and the main body case 3. The torsion coil springs 41, 42 repulse each other so that the mirror frames 21, 22 attempt to open the mirror case 2, a hook 2f and a hook hole 3f engage each other to retain the state of connection of the two, and therefore the mirror frames 21, 22 are stable in the folded state.

In a state that the mirror case 2 and mirror device 90 are closed, as shown in FIG. 25 or FIG. 33, the three-dimensional image display device has a small thickness, and forms the shape of a box having no projection therearound. Therefore, it attains the state of being compact and suitable for carrying.

In contrast, when the mirror case 2 and mirror device 90 are opened, the hook 2f is detached by pushing the part of a hook point 2i of the mirror case 2 so that the mirror case 2 can be opened. At this time, the mirror frames 21, 22 automatically rotate by the repulsive force of the coil springs 41, 42, and return to the predetermined positions shown in FIG. 22 or FIG. 31. In such a manner, the state that the mirror case 2 is closed can be switched to the state for three-dimensional image viewing as shown in FIG. 22 by simple operation.

Preferable embodiments of the present invention have been described above, but the present invention is not limited to the above examples, and a number of variations can be made.

For example, in the above embodiments, the three mirrors in total of the two half mirrors and the single total reflection mirror therebehind are disposed, but the present invention is not limited to these examples, and three or more half mirrors may be disposed.

The invention claimed is:

1. A three-dimensional image viewing device, comprising:
an image display device having a screen, wherein a two-dimensional image displayed on the screen of the image display device is viewed as a three-dimensional image by using a plurality of mirrors;
a main body case into and from which the image display device can be inserted and removed, respectively;
a mirror case which is rotatably supported about a first shaft at a rear end of the main body case; and
the plurality of mirrors which are arranged on the mirror case in parallel at predetermined intervals from the front to the back of the mirror case and rotatably supported about respective second shafts, each mirror being configured to reflect an image for display at a different portion of the screen of the image display device to a viewer,
wherein the mirror case, when a three-dimensional image is viewed, rotates about the first shaft so that front end parts of the plurality of mirrors form approximately the same plane on the screen of the image display device, reflecting each imaged isplayed on the different portion of the screen of the image display device in a state that the plurality of mirrors are supported and tilted at a predetermined angle to the viewer side relative to the screen, and
the mirror case, to permit the image display device to be removed from the main body case by the viewer, rotates about the first shaft and the plurality of mirrors rotate about their respective second shafts and are accommodated in a state of being folded within the mirror case,
wherein each of the main body case and the mirror case is configured in a box shape, and
wherein the main body case and the mirror case combine to form a single box shape in a state that the image display device is removed outside of the main body case and the mirror case is closed inside and joined with the main body case.

2. The three-dimensional image viewing device according to claim 1,
wherein the plurality of mirrors are attached to respective quadrangular mirror frames, and
in a state that the image display device is inserted into the main body case, the mirror case rotates about the first shaft to be supported in a state that front ends of the plurality of mirror frames are in contact with the screen of the image display device, and reflects an image displayed on the screen of the image display device toward the viewer.

3. The three-dimensional image viewing device according to claim 1, wherein the mirror case is caused to be rotatable between a first position in which a three-dimensional image is viewed by reflecting an image displayed on the screen of the image display device in a state that the plurality of mirrors are supported at a predetermined angle relative to the screen, the first position being attained in a state that the image display device is inserted into the main body case, and a second position in which the viewer can view directly an image displayed on the screen of the image display device without use of the plurality of mirrors, the second position being attained by backwardly rotating the mirror case about the first shaft to remove the plurality of mirrors from the screen of the image display device.

4. The three-dimensional image viewing device according to claim 1,
wherein the sides defining the heights of the plurality of quadrangular mirrors are configured to decrease from the front to the back, and
the plurality of mirrors include first and second half mirrors which are disposed on the front side and are rotatable relative to the mirror case, and a total reflection mirror disposed relatively behind the first and second half mirrors and fixed on the mirror case.

5. The three-dimensional image viewing device according to claim 1, wherein the main body case includes a flange surrounding the main body case, and a housing part which lies within a part surrounded by the flange and accommodates the image display device.

6. The three-dimensional image viewing device according to claim 1, wherein the main body case includes a pair of soft components disposed on both sides of an inner part of the main body case, and retains, by the soft components, a side part of the image display device to which it is inserted.

7. The three-dimensional image viewing device according to claim 1, wherein the main body case includes a socket part at which a top head part of the image display device is inserted into its inner part, and a flat spring which lies at the inner bottom of the socket part and presses the bottom of the inserted image display device upward.

8. The three-dimensional image viewing device according to claim 7,
- wherein the plurality of mirrors are attached to respective quadrangular mirror frames,
- the first shaft and front end parts of the plurality of mirror frames are on the same plane on the screen of the image display device during three-dimensional image viewing,
- a shaft bearing which engages the first shaft is provided at the rear end of the main body case,
- a reference plane formed by an upper part within the socket part of the main body case is on the same plane as the shaft bearing,
- when the image display device is attached to the body socket, the screen of the image display device is brought into contact with the reference plane by the pressure of the flat spring part of the main body case, and
- the plurality of mirror frames are positioned at the screen, regardless of a tilt due to a difference in thickness of the image display device.

9. The three-dimensional image viewing device according to claim 1,
- wherein a hook is provided at a front end of the mirror case,
- a hook hole is provided in a front part of the flange of the main body case, and
- when the mirror case is rotated and is closed inside the main body case, the hook and the hook hole are engaged to retain the state that the mirror case and the main body case are combined.

\* \* \* \* \*